United States Patent
Shikii et al.

(10) Patent No.: US 9,201,187 B2
(45) Date of Patent: Dec. 1, 2015

(54) LIGHT-EMITTING DEVICE, AND LIQUID CRYSTAL DISPLAY DEVICE AND IMAGE DISPLAY DEVICE THAT USE THE SAME

(75) Inventors: Shinichi Shikii, Nara (JP); Katsuhiko Hayashi, Nara (JP); Motonobu Yoshikawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 337 days.

(21) Appl. No.: 13/522,415

(22) PCT Filed: Nov. 16, 2011

(86) PCT No.: PCT/JP2011/006385
§ 371 (c)(1),
(2), (4) Date: Jul. 16, 2012

(87) PCT Pub. No.: WO2012/066778
PCT Pub. Date: May 24, 2012

(65) Prior Publication Data
US 2012/0287037 A1    Nov. 15, 2012

Related U.S. Application Data

(60) Provisional application No. 61/414,475, filed on Nov. 17, 2010.

(51) Int. Cl.
| | |
|---|---|
| *G09G 5/10* | (2006.01) |
| *F21V 8/00* | (2006.01) |
| *H04N 13/04* | (2006.01) |
| *G02B 27/22* | (2006.01) |

(52) U.S. Cl.
CPC ............ *G02B 6/0056* (2013.01); *G02B 27/225* (2013.01); *H04N 13/0418* (2013.01); *H04N 13/0477* (2013.01); *G02B 6/0038* (2013.01); *H04N 2213/001* (2013.01)

(58) Field of Classification Search
CPC .......... G02B 27/017; G02B 2027/014; G02B 2027/0178; G02B 27/2214; G02B 2027/0138; G02B 21/0012; G02B 27/0172; G02B 27/22; G02B 2027/0187; G02B 6/0048; G02B 2027/0118; G02B 21/22; G02B 2027/0132; G02B 27/225; G02B 27/2264; G02B 27/0093; G02B 6/0068; G02B 27/26
USPC ..................... 345/87, 98–100, 102
See application file for complete search history.

(56) References Cited

U.S. PATENT DOCUMENTS

| 7,609,445 B2 | 10/2009 | Hamagishi |
| 7,720,116 B2 | 5/2010 | Anderson et al. |

(Continued)

FOREIGN PATENT DOCUMENTS

| CN | 1834729 A | 9/2006 |
| JP | 7-98439 | 4/1995 |

(Continued)

OTHER PUBLICATIONS

International Search Report issued Feb. 21, 2012 in corresponding International Application No. PCT/JP2011/006385.

(Continued)

*Primary Examiner* — Duc Dinh
(74) *Attorney, Agent, or Firm* — Wenderoth, Lind & Ponack, L.L.P.

(57) ABSTRACT

A light-emitting device used in a liquid crystal display device is provided with a planar illuminator that focuses emitted light on a predetermined light focus point, and an optical deflector that two dimensionally deflects the light from the planar illuminator. The planar illuminator switches an emission direction of the light to enable alternate switching between a first light focus state in which the predetermined light focus point is the position of a right eye of a viewer and a second light focus state in which the predetermined light focus point is the position of a left eye of the viewer. The optical deflector can modulate each of the predetermined light focus point in the first light focus state and the predetermined light focus point in the second light focus state according to movement of the viewer.

6 Claims, 12 Drawing Sheets

(56) References Cited

U.S. PATENT DOCUMENTS

| | | |
|---|---|---|
| 7,916,221 B2 * | 3/2011 | Daiku ............... 349/15 |
| 8,144,293 B2 | 3/2012 | Daiku |
| 2005/0265403 A1 | 12/2005 | Anderson et al. |
| 2005/0271325 A1 | 12/2005 | Anderson et al. |
| 2006/0209371 A1 | 9/2006 | Hamagishi |
| 2007/0069978 A1 | 3/2007 | Daiku |
| 2007/0070275 A1 | 3/2007 | Daiku |
| 2008/0008413 A1 | 1/2008 | Anderson et al. |
| 2008/0008414 A1 | 1/2008 | Anderson et al. |
| 2008/0246837 A1 | 10/2008 | Schultz et al. |
| 2010/0046049 A1 | 2/2010 | Kroll et al. |
| 2010/0073601 A1 | 3/2010 | Daiku |
| 2010/0177025 A1 * | 7/2010 | Nagata et al. ............ 345/76 |
| 2011/0058122 A1 | 3/2011 | Shikii et al. |
| 2013/0155337 A1 | 6/2013 | Sugiyama et al. |

FOREIGN PATENT DOCUMENTS

| | | | |
|---|---|---|---|
| JP | 07-098439 | * | 4/1995 |
| JP | 8-101367 | | 4/1996 |
| JP | 10-271536 | | 10/1998 |
| JP | 11-234705 | | 8/1999 |
| JP | 2000-4452 | | 1/2000 |
| JP | 2005-266569 | | 9/2005 |
| JP | 2005-266591 | | 9/2005 |
| JP | 2005-292722 | | 10/2005 |
| JP | 2007-94035 | | 4/2007 |
| JP | 2009-211873 | | 9/2009 |
| JP | 2010-524047 | | 7/2010 |
| WO | 2005/069918 | | 8/2005 |
| WO | 2008/124709 | | 10/2008 |
| WO | 2010/116702 | | 10/2010 |
| WO | 2013/014875 | | 1/2013 |

OTHER PUBLICATIONS

Office Action with Search Report issued Mar. 31, 2015 in corresponding Chinese Application No. 201180006222.9 (with English translation of Search Report).

Extended European Search Report issued Jul. 17, 2015 in corresponding European Application No. 11840860.8.

* cited by examiner

LIGHT-EMITTING DEVICE, AND LIQUID CRYSTAL DISPLAY DEVICE AND IMAGE DISPLAY DEVICE THAT USE THE SAME

This application claims the benefit of U.S. Provisional Application No. 61/414,475, filed Nov. 17, 2010.

TECHNICAL FIELD

The present invention relates to a light-emitting device, and a liquid crystal display device and an image display device that uses the light-emitting device, which can be used as a 3D liquid crystal display device and a privacy display, for example.

BACKGROUND ART

Examples of an image display device include a liquid crystal display device. The liquid crystal display device includes a liquid crystal panel as a spatial modulation element and a light-emitting device (backlight) that emits light toward a back surface of the liquid crystal panel. By spatially modulating light passing through the liquid crystal panel, an image is formed on the liquid crystal panel.

In order to further enhance the presence of the image displayed on the liquid crystal display device, a 3D liquid crystal display device capable of displaying a 3D (three-dimensional) image has been developed. This 3D liquid crystal display device can present different images to viewer's left and right eyes to produce parallax, thereby causing the viewer to visually recognize a 3D image.

For example, there has been proposed a glasses-type 3D liquid crystal display device in which the viewer puts on dedicated glasses having a special optical effect to visually recognize the 3D image. However, in this glasses-type 3D liquid crystal display device, the viewer must take the trouble of putting on the glasses, which is inconvenient. For this reason, in recent years, a glasses-free 3D liquid crystal display device that enables the viewer to visually recognize the 3D image with his/her naked eyes has been proposed (Refer to, for example, Patent literature 1).

In a light-emitting device of the glasses-free 3D liquid crystal display device, for example, a right light source and a left light source are disposed on both respective side surfaces of a light guide plate having special shape. The right light source and the left light source are alternately lighted. When the right light source is lighted, light from the right light source is incident on one side surface of the light guide plate, and light emitted from the light guide plate is focused on the right eye of the viewer. When the left light source is lighted, light from the left light source is incident on the other side surface of the light guide plate, and light emitted from the light guide plate is focused on the left eye of the viewer. By displaying an image for right eye on the liquid crystal panel while the right light source is lighted and displaying an image for left eye while the left light source is lighted, the viewer can visually recognize the 3D image with his/her naked eyes. This principle can be applied to the 3D liquid crystal display device as well as a privacy display that prevents the third person from peeping the displayed image.

CITATION LIST

Patent Literature

[Patent literature 1] Japanese Unexamined Patent Application Publication 2010-524047

SUMMARY OF INVENTION

Technical Problem

However, in the above-mentioned conventional glasses-free 3D liquid crystal display device, in order to visually recognize the 3D image, it is need to fix both eyes of the viewer at predetermined positions. When the viewer's both eyes are displaced from the predetermined positions, light from the light guide plate is not focused on the viewer's both eyes and therefore, the viewer cannot visually recognize the 3D image. Thus, such tablet-type 3D liquid crystal display device has a limitation that the viewer must not largely move his/her head relative to the 3D liquid crystal display device, which is inconvenient. Further, in some cases, the viewer does not found the displacement of both his/her eyes from the predetermined positions and cannot visually recognize the 3D image with accuracy.

The present invention solves the above-mentioned conventional problems, and its object is to provide a light-emitting device capable of extending a visual field in which the 3D image and the like can be visually recognized, and a liquid crystal display device using the light-emitting device. Another object of the present invention is to provide an image display device capable of promoting the viewer to return positions of his/her both eyes to a proper visual field.

Solution to Problem

To attain the above-mentioned object, one aspect of a light-emitting device of the present invention is a light-emitting device for use in a liquid crystal display device that alternately focuses light on positions of a right eye and a left eye of a viewer, including a planar illuminator that focuses emitted light on a predetermined light focus point, and an optical deflector that two-dimensionally deflects the light from the planar illuminator, wherein the planar illuminator switches an emission direction of the light to enable alternate switching between a first light focus state in which the predetermined light focus point is the position of the right eye of the viewer and a second light focus state in which the predetermined light focus point is the position of the left eye of the viewer, and the optical deflector can modulate each of the predetermined light focus point in the first light focus state and the predetermined light focus point in the second light focus state according to the movement of the viewer.

From this aspect, the optical deflector modulates each of the predetermined light focus point in the first light focus state and the predetermined light focus point in the second light focus state according to the movement of the viewer. By using the light-emitting device from this aspect in the liquid crystal display device, for example, even when the viewer moves relative to the liquid crystal display device, the viewer can continue to visually recognize the 3D image and therefore, the visual field in which the 3D image and the like are viewable can be extended.

From one aspect of the light-emitting device of the present invention, it is preferred that the planar illuminator includes a light source that emits single polarized light and is capable of switching a polarization property of the single polarized light, and a light guide plate having one side surface that receives the single polarized light from the light source and a principle surface that is orthogonal to the one side surface and emits light, and by the light source switching the polarization property of the single polarized light, the planar illuminator is capable of switching a direction of the light emitted from the principle surface of the light guide plate.

From this aspect, by the light source switching the polarization property of the single polarized light, the planar illuminator can switch a direction of the light emitted from the principle surface of the light guide plate. Thereby, the planar illuminator can easily switch the direction of the light.

From one aspect of the light-emitting device of the present invention, it is predetermined that the planar illuminator further includes a polarizing modulation plate provided on a light-emitting side of the light guide plate, a polarizing filter that is provided on a light-emitting side of the polarizing modulation plate and reflects polarized light polarizing in a predetermined direction out of light from the polarizing modulation plate, and a prism sheet provided on a light-emitting side of the polarizing filter, the polarizing modulation plate includes a polarizing modulation cell functioning as a wavelength plate that modulates the polarization property of the light, and a non-polarizing modulation cell that does not modulate the polarization property of the light, the prism sheet is configured to deflect transmitted light at a first position corresponding to the polarizing modulation cell and at a second position corresponding to the non-polarizing modulation cell in respective different directions, and by the light source switching the polarization property of the single polarized light, the planar illuminator can switch between a first state and a second state, the first state being a state in which light from the non-polarizing modulation cell is reflected on the polarizing filter and light from the polarizing modulation cell passes through the polarizing filter and is incident on the first position of the prism sheet, and the second state being a state in which the light from the polarizing modulation cell is reflected on the polarizing filter and the light from the non-polarizing modulation cell passes through the polarizing filter and is incident on the second position of the prism sheet.

From this aspect, by the light source switching the polarization property of the single polarized light, the planar illuminator can switch between the first state and the second state. Thereby, the planar illuminator can easily switch the direction of the light.

One aspect of the light-emitting device of the present invention is a light-emitting device used in a liquid crystal display device that alternately focuses light on positions of a right eye and a left eye of a viewer, including a planar illuminator that emits light, an optical deflector that two-dimensionally deflects the light from the planar illuminator, and a Fresnel lens or a prism sheet that focuses incident light on a predetermined light focus point, wherein the optical deflector switches a light deflection angle to enable alternate switching between a first light focus state in which the predetermined light focus point is the position of the right eye of the viewer and a second light focus state in which the predetermined light focus point is the position of the left eye of the viewer.

From this aspect, since the optical deflector switches a light deflection angle, thereby alternately switching the predetermined light focus point between the first light focus state and the second light focus state, by using the light-emitting device from this aspect in the liquid crystal display device, the 3D image can be displayed. Further, since the Fresnel lens or the prism sheet is provided, the light deflection angle in the vicinity of both ends of the optical deflector can be made small.

From one aspect of the light-emitting device of the present invention, it is preferred that the optical deflector can further modulate the predetermined light focus point in the first light focus state and the predetermined light focus point in the second light focus state according to movement of the viewer.

From this aspect, the predetermined light focus point in the first light focus state and the predetermined light focus point in the second light focus state each can be modulated according to the movement of the viewer. Thus, by using the light-emitting device from this aspect in the liquid crystal display device, for example, even when the viewer moves relative to the liquid crystal display device, the viewer can continue to visually recognize the 3D image and the like and therefore, the visual field in which the 3D image and the like are viewable can be extended.

One aspect of a light-emitting device of the present invention is a light-emitting device including a planar illuminator that emits light, and an optical deflector that two-dimensionally deflects the light from the planar illuminator, wherein the planar illuminator includes a light source that emits single polarized light and is capable of switching a polarization property of the single polarized light, a light guide plate having one side surface that receives the light from the light source and a principle surface that is orthogonal to the one side surface and emits light, a polarizing modulation plate provided on a light-emitting side of the light guide plate, a polarizing filter that is provided on a light-emitting side of the polarizing modulation plate and reflects polarized light polarizing in a predetermined direction, and a diffuser panel provided on a light-emitting side of the polarizing filter, the polarizing modulation plate includes a polarizing modulation cell functioning as a wavelength plate that modulates the polarization property of the light, and a non-polarizing modulation cell that does not modulate the polarization property of the light, the diffuser panel includes a diffusing area that diffuses light, and a non-diffusing area that does not diffuse light, the diffusing area is arranged so as to correspond to the polarizing modulation cell and the non-diffusing area is arranged so as to correspond to the non-polarizing modulation cell, and by the light source switching the polarization property of the single polarized light, the planar illuminator can switch between a light diffused state in which light from the non-polarizing modulation cell is reflected on the polarizing filter and light from the polarizing modulation cell passes through the polarizing filter and is incident on the diffusing area and a non-light diffused state in which the light from the polarizing modulation cell is reflected on the polarizing filter and the light from the non-polarizing modulation cell passes through the polarizing filter and is incident on the non-diffusing area.

From this aspect, by the light source switching the polarization property of the single polarized light, the planar illuminator can switch between the light diffused state and the non-light diffused state. By using the light-emitting device from this aspect in the liquid crystal display device, when the planar illuminator is switched to the non-light diffused state, the liquid crystal display device can be used as the 3D liquid crystal display device or the privacy display. When the planar illuminator is switched to the light diffused state, the liquid crystal display device can be used as the 2D liquid crystal display device.

One aspect of a light-emitting device of the present invention is a light-emitting device including a planar illuminator that emits light, and an optical deflector that two-dimensionally deflects the light from the planar illuminator, wherein the planar illuminator includes a light source that emits single polarized light and can switch a polarization property of the single polarized light, a light guide plate having one side surface that receives the light from the light source and a principle surface that is orthogonal to the one side surface and emits light, a polarizing modulation plate provided on a light-emitting side of the light guide plate, a polarizing filter that is provided on a light-emitting side of the polarizing modulation plate and reflects polarized light polarizing in a predetermined direction, and a diffuser panel provided on a light-emitting side of the polarizing filter, the polarizing modulation plate includes a polarizing modulation cell functioning as a wavelength plate that modulates the polarization property of the light, and a non-polarizing modulation cell that does not modulate the polarization property of the light, the diffuser panel includes a diffusing area that diffuses light, and a non-diffusing area that does not diffuse light, the diffusing area is arranged so as to correspond to the non-polarizing modulation cell and the non-diffusing area is arranged so as to correspond to the non-polarizing modulation cell, and by the light source switching the polarization property of the single polarized light, the planar illuminator can switch between a light diffused state in which light from the polarizing modulation cell is reflected on the polarizing filter and light from the non-polarizing modulation cell passes through the polarizing filter and is incident on the diffusing area and a non-light diffused state in which the light from the non-polarizing modulation cell is reflected on the polarizing filter and the light from the polarizing modulation cell passes through the polarizing filter and is incident on the non-diffusing area.

From this aspect, by the light source switching the polarization property of the single polarized light, the planar illuminator can switch between the light diffused state and the non-light diffused state. By using the light-emitting device from this aspect in the liquid crystal display device, when the planar illuminator is switched to the non-light diffused state, the liquid crystal display device can be used as the 3D liquid crystal display device or the privacy display. When the planar illuminator is switched to the light diffused state, the liquid crystal display device can be used as the 2D liquid crystal display device.

Further, from one aspect of the light-emitting device of the present invention, it is preferred that the optical deflector is configured of a liquid crystal deflection element capable of switching a light deflecting direction, and a voltage is applied to the liquid crystal deflection element to modulate a refractive index of the liquid crystal deflection element, thereby switching the deflecting direction of light incident on the liquid crystal deflection element.

From this aspect, the light deflecting direction of the optical deflector can be easily switched.

One aspect of the liquid crystal display device of the present invention is a liquid crystal display device including the light-emitting device according to any one of Claims 1 to 5, and a liquid crystal panel provided on a light-emitting side of the light-emitting device, wherein the liquid crystal panel is irradiated with light emitted from the light-emitting device.

From this aspect, for example, even when the viewer moves relative to the liquid crystal display device, the viewer can continue to visually recognize the 3D image and the like. Thereby, the visual field in which the 3D image and the like are viewable can be extended.

From one aspect of the liquid crystal display device of the present invention, it is preferred that the liquid crystal panel has a plurality of pixel rows to which a pixel value is sequentially inputted on a predetermined scan cycle, and the optical deflector of the light-emitting device deflects light while scanning the light in sync with the predetermined scan cycle.

From this aspect, the high-quality liquid crystal display device without crosstalk can be realized.

From one aspect of the liquid crystal display device of the present invention, it is preferred that a detector that detects positions of the right eye and the left eye of the viewer who visually recognizes the liquid crystal display device is further provided, and the predetermined light focus point on which light is focused by the light-emitting device is the position of the right eye of the viewer and the position of the left eye of the viewer, which is detected by the detector.

From this aspect, the light from light-emitting device can be correctly focused on the position of the right eye of the viewer and the position of the left eye of the viewer.

One aspect of the liquid crystal display device of the present invention is a liquid crystal display device including the light-emitting device according to Claim 4 or 5, and a liquid crystal panel provided on a light-emitting side of the light-emitting device, wherein the liquid crystal panel is irradiated with light emitted from the light-emitting device, and the Fresnel lens of the light-emitting device is a linear Fresnel lens and the linear Fresnel lens is arranged inclined relative to a pixel included in the liquid crystal panel.

From this aspect, it is possible to suppress the occurrence of moire due to arrangement cycle of irregularities of the Fresnel lens and arrangement cycle of pixels of the liquid crystal panel.

One aspect of a liquid crystal display device of the present invention is a liquid crystal display device including the light-emitting device according to Claim 6 or 7, and a liquid crystal panel provided on a light-emitting side of the light-emitting device, wherein a diffusing area and a non-diffusing area in the diffuser panel of the light-emitting device are alternately arranged, and in the light diffused state, the liquid crystal panel is irradiated with light emitted from the diffusing area of the diffuser panel, and in the non-light diffused state, the liquid crystal panel is irradiated with light emitted from the non-diffusing area of the diffuser panel.

From this aspect, the 3D liquid crystal display device that can be switched between the 3D liquid crystal display device or the privacy display and the 2D liquid crystal display device can be realized.

One aspect of an image display device of the present invention is an image display device including a display unit configured to display an image, a detector that detects a position of an eye of a viewer who visually recognizes the display unit, and an informing unit configured to informs the viewer that the position of the eye, which is detected by the detector, falls outside a predetermined area, when it occurs.

From this aspect, it is possible to promote the viewer to return the positions of the right eye and the left eye of the viewer to a proper visual field.

Advantageous Effects of Invention

As described above, in the light-emitting device and the liquid crystal display device using the light-emitting device according to the present invention, for example, even when the viewer moves, the viewer can continue to visually recognize the 3D image and the like (including an image displayed on the privacy display) and therefore, the visual field in which the 3D image and the like are viewable can be extended. Further, the image display device of the present invention can promote the viewer to return the positions of the right eye and the left eye of the viewer to a proper visual field.

DESCRIPTION OF EMBODIMENTS

Figure 1A:
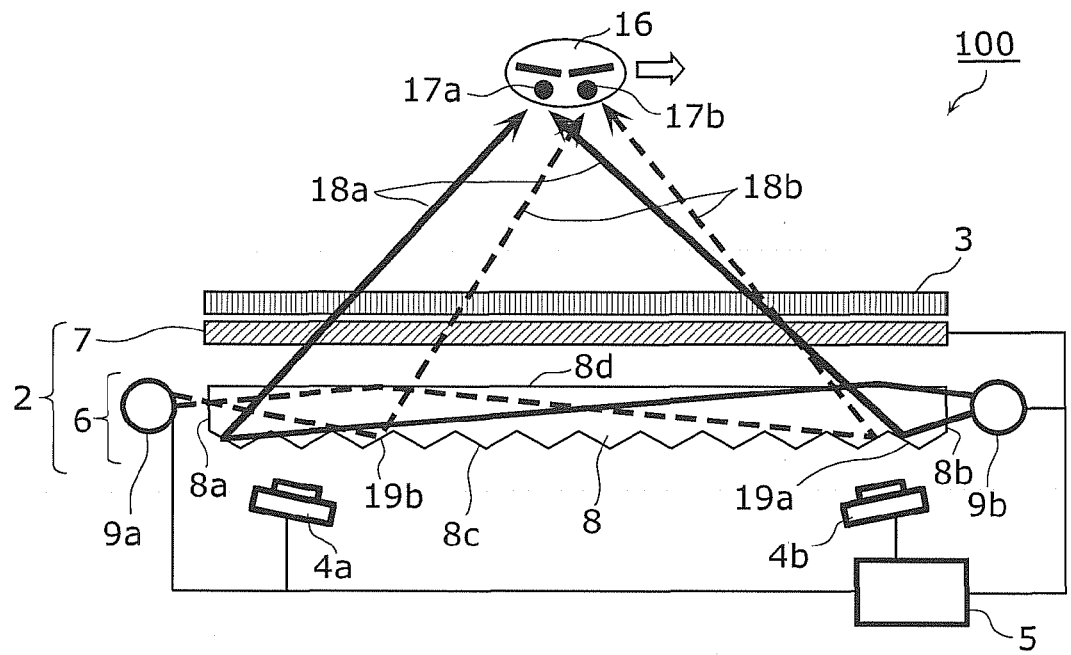
FIG. 1A is a sectional view showing a configuration of a liquid crystal display device in accordance with Embodiment 1 of the present invention.

Embodiments of the present invention will be described below with reference to figures. In following description, same components are given same reference numerals and description thereof may be omitted. Each of the below-mentioned embodiments represents one specific preferable example of the present invention. Numeric values, shape, materials, components and arrangement of the components are merely examples, and do not intend to limit the present invention. The present invention is limited only by Claims. Therefore, among components in the following embodiments, components that are not described in independent claims representing the most dominant concept are described as element that are not essential for attaining objects of the present invention, but constitute a more preferable mode. For easier comprehension, each of main components is schematically shown.

Embodiment 1

Figure 1B:
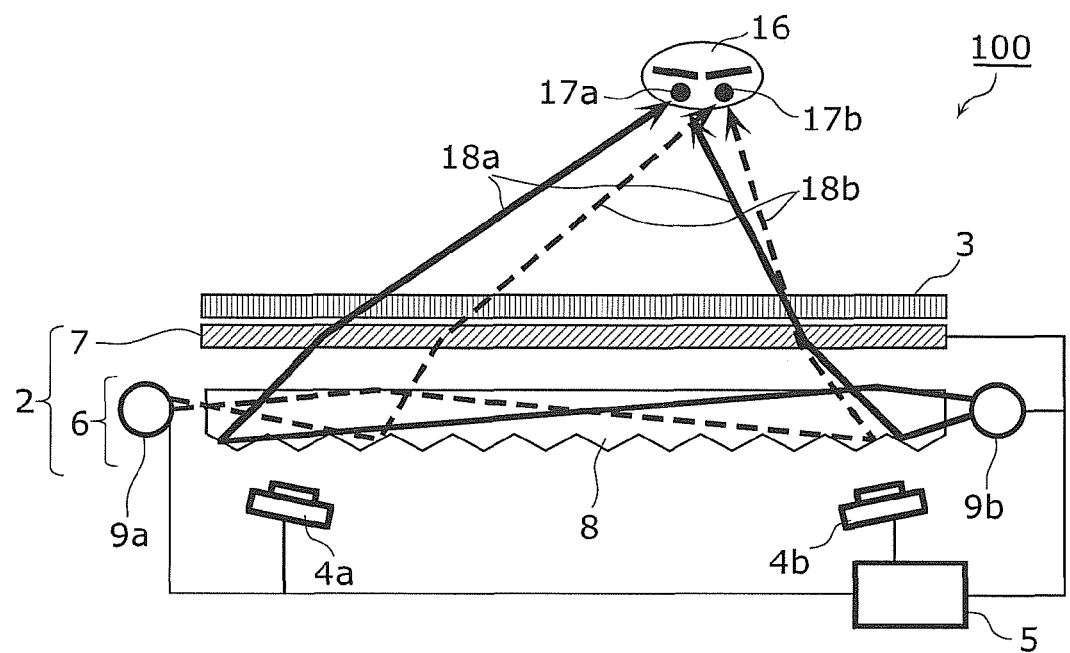
FIG. 1B is a sectional view showing the configuration of the liquid crystal display device in accordance with Embodiment 1 of the present invention.
Figure 2:
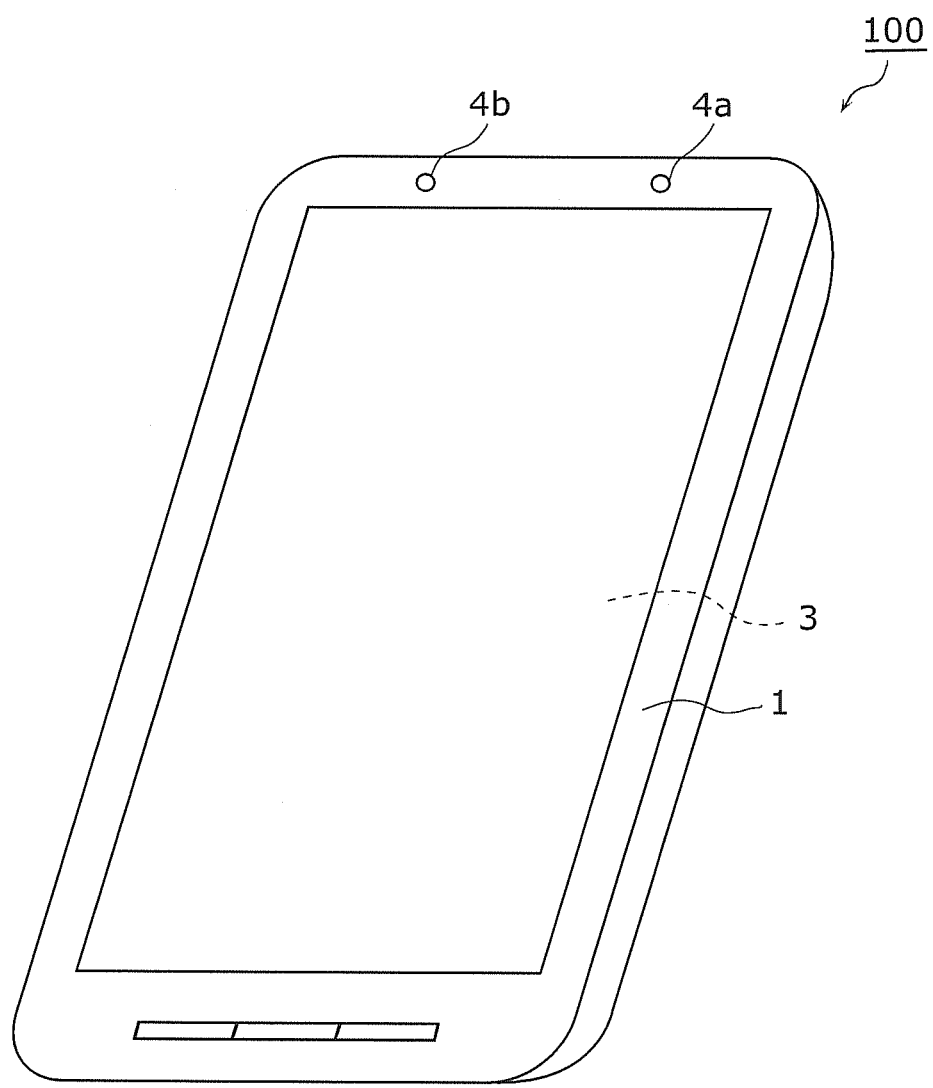
FIG. 2 is a perspective view showing an outer appearance of the liquid crystal display device in accordance with Embodiment 1 of the present invention.

FIG. 1A and FIG. 1B are sectional views showing a configuration of a liquid crystal display device in accordance with Embodiment 1 of the present invention. FIG. 2 is a perspective view showing an outer appearance of the liquid crystal display device in accordance with Embodiment 1 of the present invention. In this embodiment, the liquid crystal display device 100 is formed of a tablet-type glasses-free 3D liquid crystal display device. As shown in FIG. 2, the liquid crystal display device 100 has a rectangular frame 1. A light-emitting device 2, liquid crystal panel 3, a right camera 4a, a left camera 4b and a control unit 5 are mounted in the frame 1.

The light-emitting device 2 includes a planar illuminator 6 and an optical deflector 7 provided on a light-emitting side of the planar illuminator 6.

The planar illuminator 6 has a light guide plate 8, a light source 9a provided opposed to one side surface 8a of the light guide plate 8 and a light source 9b provided opposed to the other side surface 8b of the light guide plate 8. As described later, the planar illuminator 6 focuses emitted light on a predetermined light focus point. A bottom surface 8c of the light guide plate 8 is shaped like an uneven prism. The light source 9a emits right light 18a toward the one side surface 8a of the light guide plate 8. The light source 9b emits left light 18b toward the other side surface 8b of the light guide plate 8.

The optical deflector 7 is formed like a panel, and is provided opposed to a principle surface 8d of the light guide plate 8 (that is, a surface orthogonal to the one side surface 8a of the light guide plate 8). The optical deflector 7 can two-dimensionally deflect incident light on each in-plane area of the optical deflector 7. Thereby, the optical deflector 7 can focus the incident light on the predetermined light focus point in a three-dimensional space.

Figure 3A:
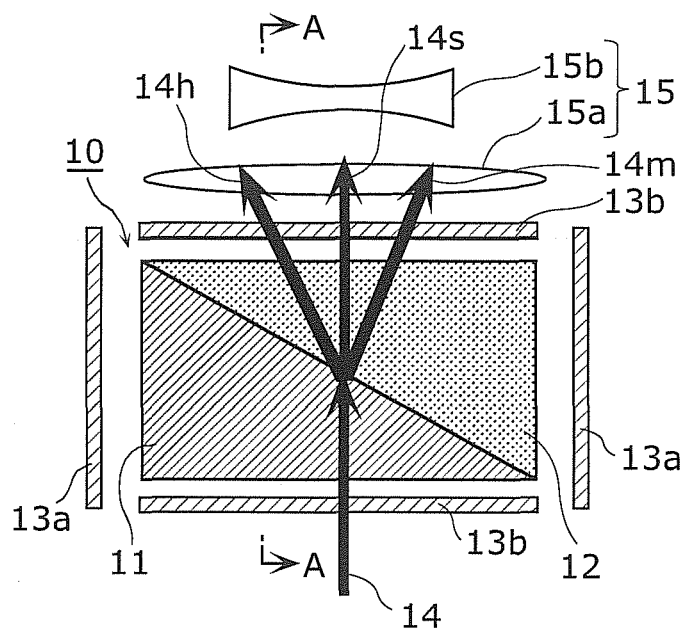
FIG. 3A is a sectional view showing a liquid crystal deflection element unit cell that configures an optical deflector.
Figure 3B:
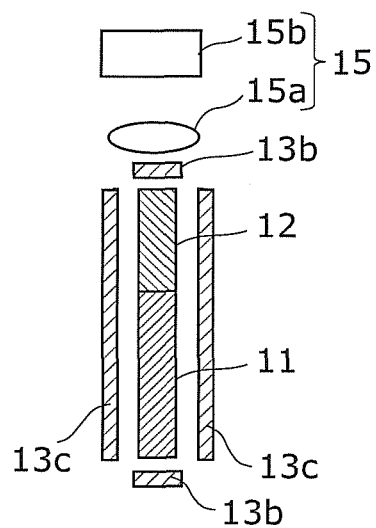
FIG. 3B is a sectional view of the liquid crystal deflection element unit cell cut along a line A-A in FIG. 3A.

FIG. 3A is a sectional view showing a liquid crystal deflection element unit cell that configures the optical deflector. FIG. 3B is a sectional view of the liquid crystal deflection element unit cell cut along a line A-A in FIG. 3A. The optical deflector 7 is formed of a liquid crystal deflection element in which a plurality of the liquid crystal deflection element unit cells 10 are arranged in a matrix. The liquid crystal deflection element unit cell 10 is generally configured as described in International Publication No. 2005/069918. As shown in FIG. 3A and FIG. 3B, the liquid crystal deflection element unit cell 10 includes a liquid crystal 11 having a triangular cross section, a dielectric 12 that compensates the liquid crystal 11 in shape, three pairs of electrodes 13a, 13b, 13c arranged around the liquid crystal 11 and the dielectric 12. The dielectric 12 is arranged on the side of an inclined surface of the liquid crystal 11, resulting in that the liquid crystal deflection element unit cell 10 is formed to have a rectangular cross section as a whole. The dielectric 12 can be made of, for example, polymer resin such as plastic or glass.

The electrodes in each of the three pairs of electrodes 13a, 13b, 13c are opposed to each other across the liquid crystal 11 and the dielectric 12. By applying a voltage between the electrodes in each of three pairs of electrodes 13a, 13b, 13c, the refractive index of the liquid crystal 11 is modulated to deflect light incident on the liquid crystal deflection element unit cell 10. The voltage applied between the electrodes in each of the pairs of electrodes 13a, 13b, 13c is controlled by the control unit 5. Although the three pairs of electrodes 13a, 13b, 13c are provided in this embodiment, one pair of electrodes or two pairs of electrodes may be provided.

Light from the planar illuminator 6, as represented by light 14 in FIG. 3A, is incident on an incident end surface (lower surface in FIG. 3A) of the liquid crystal 11. The pair of electrodes 13b are desirably transparent electrodes so as to pass light therethrough.

In the state where no voltage is applied between the electrodes in each of the pairs of electrodes 13a, 13b, 13c, when a refractive index NL of the liquid crystal 11 is the same as a refractive index ND of the dielectric 12, the light proceeds straight ahead in a direction represented by light 14s in FIG. 3A without being refracted. When the refractive index NL of the liquid crystal 11 becomes higher than the refractive index ND of the dielectric 12 as a result of application of voltage between the electrodes in each of pairs of electrodes 13a, 13b, 13c, the light is refracted in a direction represented by light 14h in FIG. 3A. When the refractive index NL of the liquid crystal 11 becomes lower than the refractive index ND of the dielectric 12 as a result of application of voltage between the electrodes in each of pairs of electrodes 13a, 13b, 13c, the light is refracted in a direction represented by light 14m in FIG. 3A. By controlling the voltage applied between the electrodes in each of pairs of electrodes 13a, 13b, 13c in this manner, a light deflection angle can be modulated.

Since change of the refractive index of the liquid crystal 11 as a result of application of voltage between the electrodes in each of pairs of electrodes 13a, 13b, 13c is about 0.1, the light deflection angle is modulated by 1 degree at maximum. For this reason, as shown in FIG. 3A and FIG. 3B, the light deflection angle can be extended by providing an angle extension lens 15 on the light-emitting side of the liquid crystal deflection element unit cell 10. In this embodiment, the angle extension lens 15 is formed by combining a convex lens 15a and a concave lens 15b. The configuration of the angle extension lens 15 is not limited to this and may be appropriately set.

The liquid crystal panel 3 is provided opposed to the optical deflector 7. A plurality of pixels are arranged in a matrix in a display region of the liquid crystal panel 3.

The right camera 4a detects a position of a right eye 17a of a viewer 16 who visually recognizes the liquid crystal display device 100. The left camera 4b detects a position of a left eye 17b of the viewer 16 who visually recognizes the liquid crystal display device 100. As shown in FIG. 2, the right camera 4a and the left camera 4b are provided at predetermined sites of the frame 1. The right camera 4a and the left camera 4b each configure a detector.

The control unit 5 controls the voltage applied to the liquid crystal 11 of each of the liquid crystal deflection element unit cells 10 that configure the optical deflector 7 on the basis of a right eye position detection signal from the right camera 4a and a left eye position detection signal from the left camera 4b to modulate the refractive index of the liquid crystal 11. The control unit 5 alternately lights the light source 9a and the light source 9b.

Next, referring to FIG. 1A and FIG. 1B, a mechanism of operations of the liquid crystal display device 100 in this embodiment will be described. The right camera 4a and the left camera 4b detects the respective positions of the right eye 17a and the left eye 17b of the viewer 16 who visually recognizes the liquid crystal display device 100. The right eye position detection signal from the right camera 4a and the left eye position detection signal from the left camera 4b each are sent to the control unit 5. The control unit 5 controls the voltage applied to the liquid crystal 11 of each of the liquid crystal deflection element unit cell 10 that configure the optical deflector 7 on the basis of the right eye position detection signal from the right camera 4a and the left eye position detection signal from the left camera 4b to modulate the refractive index of the liquid crystal 11 of each liquid crystal deflection element unit cell 10.

First, as shown in FIG. 1A, the mechanism of the operations of the liquid crystal display device 100 in the case where the viewer 16 is located on a central axis of the liquid crystal panel 3 will be described. The light source 9a and the light source 9b are alternately lighted on a time-series basis.

While the light source 9b is lighted, the right light 18a emitted from the light source 9b is incident on one side surface 8b of the light guide plate 8. The right light 18a incident from the one side surface 8b of the light guide plate 8 reaches a prism-like first inclined surface 19a (that is, a surface inclined downward toward the right in FIG. 1A) formed on the bottom surface 8c of the light guide plate 8, and is reflected toward the principle surface 8d of the light guide plate 8. The right light 18a emitted from the principle surface 8d of the light guide plate 8 passes through the optical deflector 7 and then, passes through the liquid crystal panel 3. When the viewer 16 is located on the central axis of the liquid crystal panel 3, the control unit 5 does not allow a voltage to be applied between the electrodes in each of the pairs of electrodes 13a, 13b, 13c. Thus, the right light 18a emitted from the principle surface 8d of the light guide plate 8 is incident on the liquid crystal panel 3 with the deflection angle not being modulated by the optical deflector 7. At this time, a two-dimensional right image is formed on the liquid crystal panel 3. The right light 18a emitted from the liquid crystal panel 3 is focused on the position of the right eye 17a of the viewer 16 located on the central axis of the liquid crystal panel 3. At this time, the planar illuminator 6 is in a first light focus state in which the predetermined light focus point is located at the right eye 17a of the viewer 16.

While the light source 9a is lighted, the left light 18b emitted from the light source 9a is incident on the other side surface 8a of the light guide plate 8. The left light 18b incident from the other side surface 8a of the light guide plate 8 reaches a prism-like second inclined surface 19b (that is, a surface inclined downward to the left in FIG. 1A) formed on the bottom surface 8c of the light guide plate 8, and is reflected toward the principle surface 8d of the light guide plate 8. The left light 18b emitted from the principle surface 8d of the light guide plate 8 passes through the optical deflector 7 and then, passes through the liquid crystal panel 3. As described above, the left light 18b emitted from the principle surface 8d of the light guide plate 8 is also incident on the liquid crystal panel 3 with the deflection angle not being modulated by the optical deflector 7. At this time, a two-dimensional left image that is different from the right image is formed on the liquid crystal panel 3. The left light 18b emitted from the liquid crystal panel 3 is focused at the position of the left eye 17b of the viewer 16 located on the central axis of the liquid crystal panel 3. At this time, the planar illuminator 6 is in a second light focus state in which the predetermined light focus point is located at the left eye 17b of the viewer 16.

As described above, by alternately lighting the light source 9a and the light source 9b, displaying the right image on the liquid crystal panel 3 while the light source 9*b* is lighted and displaying the left image on the liquid crystal panel 3 while the light source 9*a* is lighted, the viewer 16 can visually recognize a 3D image. The planar illuminator 6 switches an emission direction of the light to enable alternate switching between the first light focus state and the second light focus state.

The prism shape of the bottom surface 8*c* of the light guide plate 8 is optimized such that the right light 18*a* and the left light 18*b* which are emitted from the light guide plate 8 are focused on the respective positions of the right eye 17*a* and the left eye 17*b* of the viewer 16 located on the central axis of the liquid crystal panel 3.

Next, as shown in FIG. 1B, a mechanism of operations of the liquid crystal display device 100 in the case where the viewer 16 is displaced from the central axis of the liquid crystal panel 3 will be described. For example, when the position of a head of the viewer 16 moves from side to side with respect to the liquid crystal display device 100 and the positions of the right eye 17*a* and the left eye 17*b* of the viewer 16 are displaced from the central axis of the liquid crystal panel 3, first, the right camera 4*a* and the left camera 4*b* detect the position of the right eye 17*a* of the viewer 16 and the position of the left eye 17*b* of the viewer 16, respectively.

While the light source 9*b* is lighted, the voltage applied between the electrodes in each of pairs of electrodes 13*a*, 13*b*, 13*c* is controlled by the control unit 5 to modulate the light deflection angle deflected by the optical deflector 7 such that the right light 18*a* is focused on the detected position of the right eye 17*a*. While the light source 9*a* is lighted, the voltage applied between the electrodes in each of pairs of electrodes 13*a*, 13*b*, 13*c* is controlled by the control unit 5 to modulate the light deflection angle deflected by the optical deflector 7 such that the left light 18*b* is focused on the detected position of the left eye 17*b*. In this manner, the optical deflector 7 modulates each of the predetermined light focus point in the first light focus state and the predetermined light focus point in the second light focus state according to the movement of the right eye 17*a* and the left eye 17*b* of the viewer 16. Thereby, even when the positions of the right eye 17*a* and the left eye 17*b* of the viewer 16 are displaced from the central axis of the liquid crystal panel 3, the viewer 16 can continue to visually recognize the 3D image. Therefore, the liquid crystal display device 100 in this embodiment can extend the visual field in which the 3D image is viewable.

Figure 4:
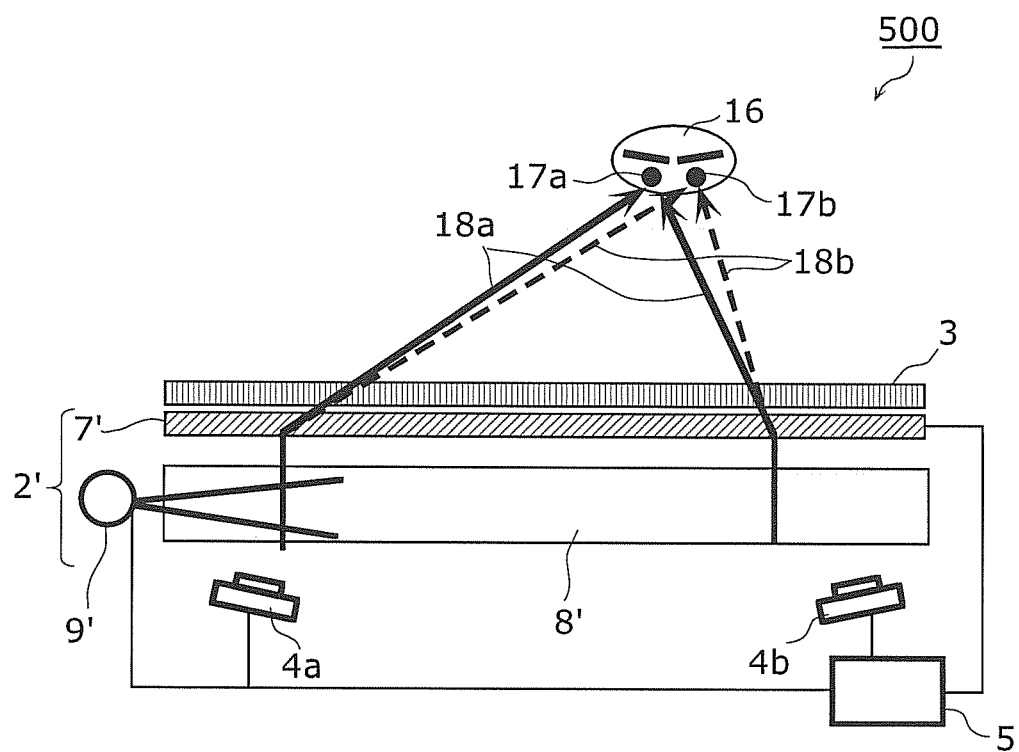
FIG. 4 is a sectional view showing a configuration of a conventional liquid crystal display device.

The liquid crystal display device 100 in this embodiment can also obtain following effects. FIG. 4 is a sectional view showing a configuration of a conventional liquid crystal display device. In the liquid crystal display device 100 in this embodiment, the planar illuminator 6 has the function of switching between the right light 18*a* for right eye and the left light 18*b* for left eye. However, in the case where a response speed of an optical deflector 7' is high as in a liquid crystal display device 500 shown in FIG. 2, the optical deflector 7' may have the above-mentioned function. In the liquid crystal display device 500 shown in FIG. 2, a single light source 9' is provided and an emission direction of light from a light guide plate 8' is a direction substantially vertical to the light guide plate 8'. For this reason, in the stage where light is emitted from the light guide plate 8', the light is not deflected toward the positions of the right eye 17*a* and the left eye 17*b* of the viewer 16, and the optical deflector 7' deflects the light toward the positions of the right eye 17*a* and the left eye 17*b* of the viewer 16 and follows the movement of the viewer 16.

However, in the liquid crystal deflection element that modulates the refractive index of the liquid crystal to control the light deflecting direction, which is generally used as an optical deflector, the response speed of the liquid crystal may be as slow as a few milliseconds. For this reason, there may be cases where the response speed of the liquid crystal cannot catch up with a switching speed of the light deflecting direction between the right light 18*a* and the left light 18*b* and therefore, the optical deflector has difficulty in performing its function. Specifically, since a frame rate of an image is 60 frames/second, 1 frame takes 16 milliseconds. Thus, to switch the light deflecting direction between the right light 18*a* and the left light 18*b*, it is need to switch the light deflecting direction at a subframe speed of 8 milliseconds. In the case of using the liquid crystal deflection element as the optical deflector, when the response speed of the liquid crystal deflection element is about 4 milliseconds, the light deflecting direction is switched in a period of a half of 1 subframe, disadvantageously causing crosstalk.

On the contrary, in the liquid crystal display device 100 in this embodiment, the optical deflector 7 has only the function of following the movement of the right eye 17*a* and the left eye 17*b* of the viewer 16, and the planar illuminator 6 has the function of switching the light deflecting direction between the right light 18*a* and the left light 18*b*. By separating both the functions from each other, even if the response speed of the optical deflector 7 is low, the movement of the right eye 17*a* and the left eye 17*b* of the viewer 16 can be easily followed, and the liquid crystal display device 100 having a wide visual field can be achieved. In the case of using semiconductor light sources such as LEDs and lasers as a right light source 9*a* and a left light source 9*b*, since the semiconductor light sources or the like can be driven at a response speed of a micro second or less, the response speed of the semiconductor light sources or the like can be made much higher than 8 milliseconds of the switching speed between the right light 18*a* and the left light 18*b*.

Since the optical deflector 7 does not need to have the function of switching the light deflecting direction between the right light 18*a* and the left light 18*b*, in the case where the liquid crystal deflection element unit cell 10 shown in FIG. 3A is used as a unit cell of the optical deflector 7, the magnification factor of the angle extension lens 15 can be reduced. Therefore, even when variation in an extension angle of light incident on the optical deflector 7 is large, variation in an extension angle of light emitted from the optical deflector 7 does not become relatively large, resulting in the liquid crystal display device capable of displaying a high-quality 3D image with small crosstalk.

Although the liquid crystal display device 100 is configured of the 3D liquid crystal display device in this embodiment, it may be configured of a privacy display that prevents the third person from peeping a displayed image. In this case, by making the right image and the left image, which are displayed on the liquid crystal panel 3, identical to each other, the viewer 16 can recognize the image as a normal 2D image, but the third person other than the viewer 16 cannot visually recognize the image.

In this embodiment, the light source 9*a* and the light source 9*b* as the planar illuminator 6 that configure the liquid crystal display device 100 are arranged on the both respective ends of the light guide plate 8. However, the present invention is not limited to such arrangement. The shape of the light guide plate 8 is not limited to the shape shown in FIG. 1A. For example, although one piece of light guide plate 8 is provided in this embodiment, the light guide plate 8 may be configured as a light guide unit combined with other optical sheet or the like.

Although the right camera 4*a* and the left camera 4*b* are used to detect the positions of the right eye 17*a* and the left eye 17b of the viewer 16 in this embodiment, the positions can be detected according to other methods. For example, the right camera 4a and the left camera 4b each can take an image of a face (both eyes 17a, 17b) of the viewer 16, and positions of the both eyes 17a, 17b can be detected based on a difference between the images taken by the right camera 4a and the left camera 4b.

Although the optical deflector 7 is configured of the liquid crystal deflection element in this embodiment, the optical deflector 7 is not limited to the liquid crystal deflection element and may be configured of another light deflection element.

Embodiment 2

Next, referring to FIG. 5A to FIG. 5C, FIG. 6A to FIG. 6C and FIG. 7, a light-emitting device in accordance with Embodiment 2 of the present invention will be described. FIG. 5A to FIG. 5C and FIG. 6A to FIG. 6C are sectional views showing a configuration of the light-emitting device in accordance with Embodiment 2 of the present invention.

The light-emitting device 2A in this embodiment includes a planar illuminator 6A and the optical deflector 7 provided on the light-emitting side of the planar illuminator 6A. The planar illuminator 6A has a light source 20, a light guide plate 21, a reflective sheet 22, a polarizing modulation plate 23, a polarizing filter 24 and a prism sheet 25.

Figure 5A:
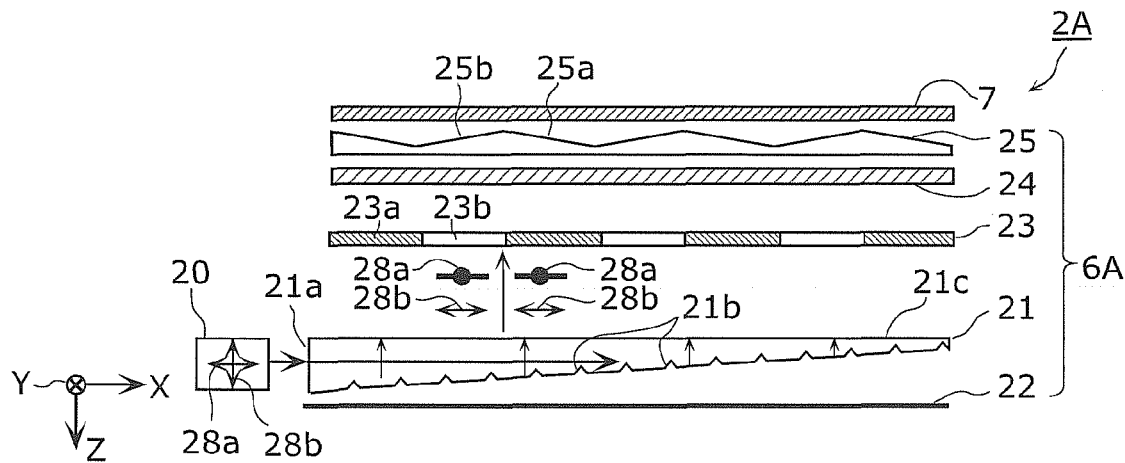
FIG. 5A is a sectional view showing a configuration of a liquid crystal display device in accordance with Embodiment 2 of the present invention.
Figure 7:
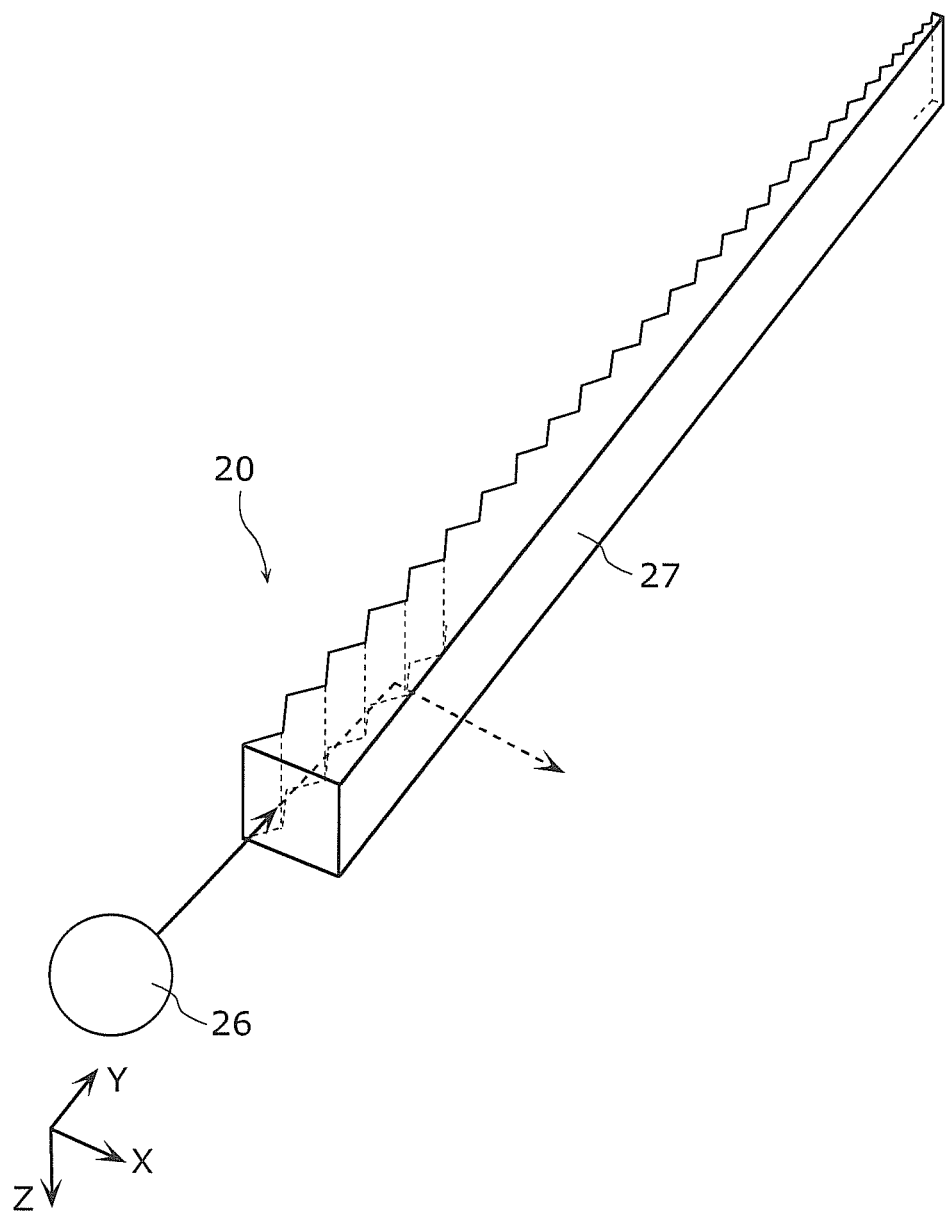
FIG. 7 is a perspective view showing a configuration of a light source in FIG. 5A.

FIG. 7 is a perspective view showing a configuration of the light source in FIG. 5A. As shown in FIG. 7, the light source 20 has a light source unit 26 and a light guide rod 27. The light source unit 26 can emit single polarized light and switch a polarization property (polarizing direction) of the single polarized light. That is, light emitted from the light source unit 26 is alternately switched between straight polarized light 28a having a polarizing direction horizontal to a travelling direction and straight polarized light 28b having a polarizing direction vertical to the travelling direction. The polarizing direction of the polarized light 28a is orthogonal to the polarizing direction of the polarized light 28b. The polarizing direction of the polarized light emitted from the light source unit 26 can be switched by use of a liquid crystal retarder, for example. The light source 20 can be configured by combining the polarized light beams from the two light source units, whose polarizing directions are orthogonal to each other. The light guide rod 27 extends in a predetermined direction, and has one side surface on which a total reflection prism. The polarized light from the light source unit 26 is incident on one end of the light guide rod 27 and then, is totally reflected on the total reflection prism. Thereby, the polarized light 28a, 28b is emitted from the other side surface of the light guide rod 27.

A total reflection prism 21b for totally reflecting light is formed on a bottom surface of the light guide plate 21. The light source 20 is provided opposed to one side surface 21a of the light guide plate 21. A principle surface 21c is formed orthogonal to the one side surface 21a of the light guide plate 21.

The reflective sheet 22 is provided opposed to a bottom surface of the light guide plate 21. As described later, the reflective sheet 22 reflects the polarized light 28a, 28b.

The polarizing modulation plate 23 is provided opposed to the principle surface 21c of the light guide plate 21. The polarizing modulation plate 23 is configured by alternately arranging a polarizing modulation cell 23a and a non-polarizing modulation cell 23b. The polarizing modulation cell 23a functions as a ½ wavelength plate that modulates the polarization property (polarizing direction) of the incident polarized light. Thereby, the polarizing directions of the polarized light 28a and the polarized light 28b that pass through the polarizing modulation cell 23a each are rotated by 90 degrees. The non-polarizing modulation cell 23b does not modulate the polarization property of the incident polarized light.

The polarizing filter 24 is provided on the light-emitting side of the polarizing modulation plate 23. The polarizing filter 24 reflects polarized light polarizing in a predetermined direction, out of polarized light from the polarizing modulation plate 23. In this embodiment, the polarizing filter 24 reflects polarized light horizontal to the sheet of FIG. 5A, and transmits polarized light vertical to the sheet of FIG. 5A.

The prism sheet 25 is provided on the light-emitting side of the polarizing filter 24. The prism sheet 25 is configured such that the deflecting direction of transmitted light at a first position 25a corresponding to the polarizing modulation cell 23a is different from the deflecting direction of transmitted light at a second position 25b corresponding to the non-polarizing modulation cell 23b.

The optical deflector 7 is provided on the light-emitting side of the prism sheet 25. The optical deflector 7 has the same configuration as the optical deflector 7 in Embodiment 1.

Next, referring to FIG. 5A to FIG. 5C and FIG. 6A to FIG. 6C, a mechanism of operations of the light-emitting device 2A in this embodiment will be described. The polarizing direction of light from the light source 20 is alternately switched between the horizontal direction on the sheet of FIG. 5A and the vertical direction on the sheet of FIG. 5A. When the polarized light 28a horizontal to the sheet of FIG. 5A is emitted from the light source 20, as shown in FIG. 5A, the polarized light 28a is incident on the one side surface 21a of the light guide plate 21, is totally reflected on the total reflection prism 21b in the light guide plate 21 and then, is emitted from the principle surface 21c of the light guide plate 21. When the polarized light 28a is totally reflected on the total reflection prism 21b, the polarizing direction is modulated to the direction vertical to a sheet of FIG. 5A.

Figure 5B:
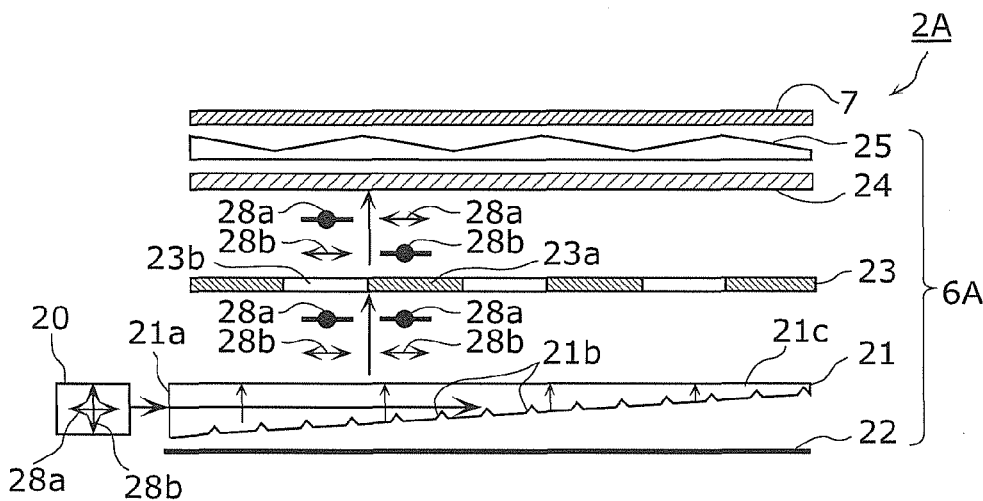
FIG. 5B is a sectional view showing the configuration of the liquid crystal display device in accordance with Embodiment 2 of the present invention.

As shown in FIG. 5B, the polarized light 28a emitted from the principle surface 21c of the light guide plate 21 is incident on the polarizing modulation cell 23a and the non-polarizing modulation cell 23b of the polarizing modulation plate 23. The polarizing direction of the polarized light 28a passing through the polarizing modulation cell 23a is rotated by 90 degrees, thereby being modulated to the horizontal direction on the sheet of FIG. 5B. The polarizing direction of the polarized light 28a passing through the non-polarizing modulation cell 23b is kept vertical to the sheet of FIG. 5B without being modulated.

Figure 5C:
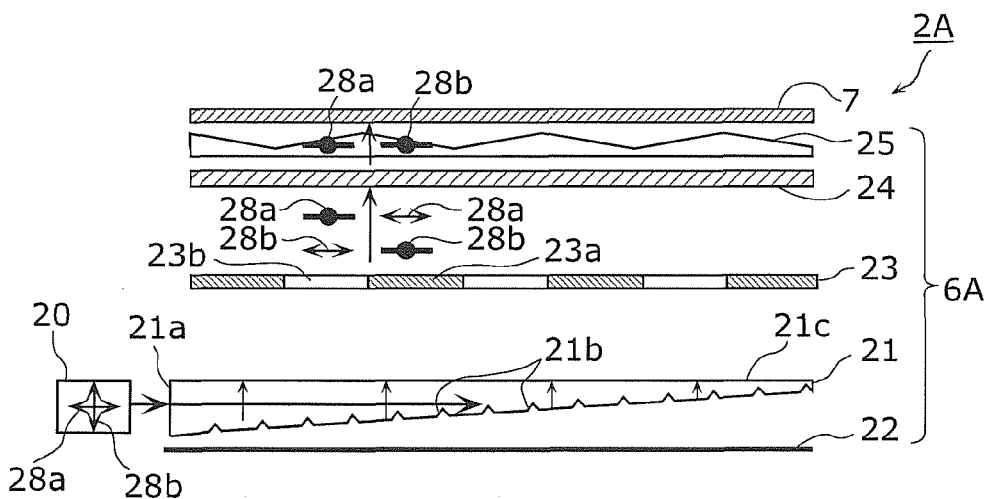
FIG. 5C is a sectional view showing the configuration of the liquid crystal display device in accordance with Embodiment 2 of the present invention.

As shown in FIG. 5C, the polarized light 28a emitted from the polarizing modulation plate 23 is incident on the polarizing filter 24. The polarizing filter 24 reflects the polarized light 28a horizontal to the sheet of FIG. 5C and transmits the polarized light 28a vertical to the sheet of FIG. 5C.

Figure 6A:
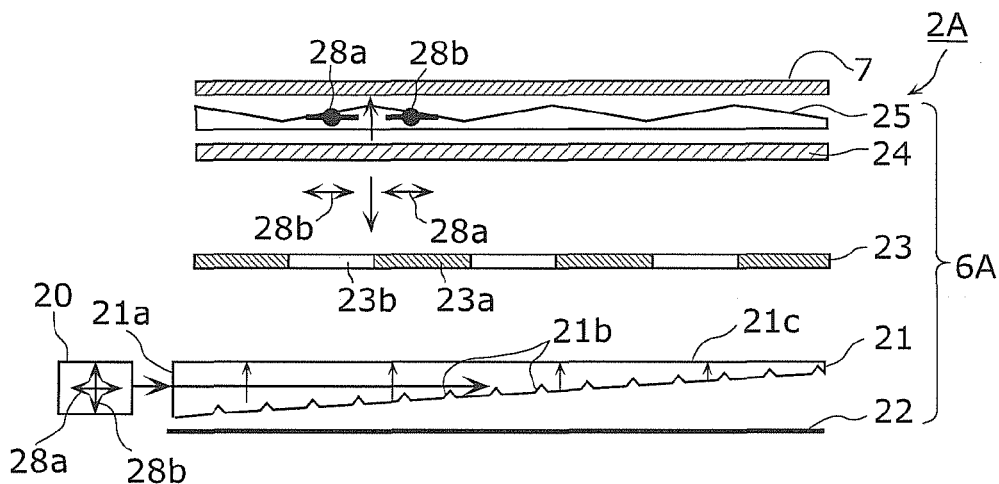
FIG. 6A is a sectional view showing the configuration of the liquid crystal display device in accordance with Embodiment 2 of the present invention.
Figure 6B:
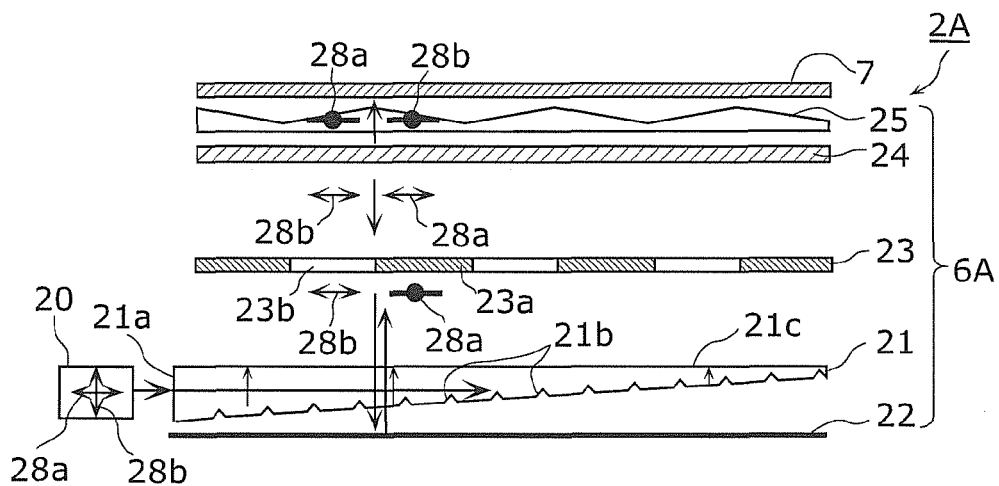
FIG. 6B is a sectional view showing the configuration of the liquid crystal display device in accordance with Embodiment 2 of the present invention.
Figure 6C:
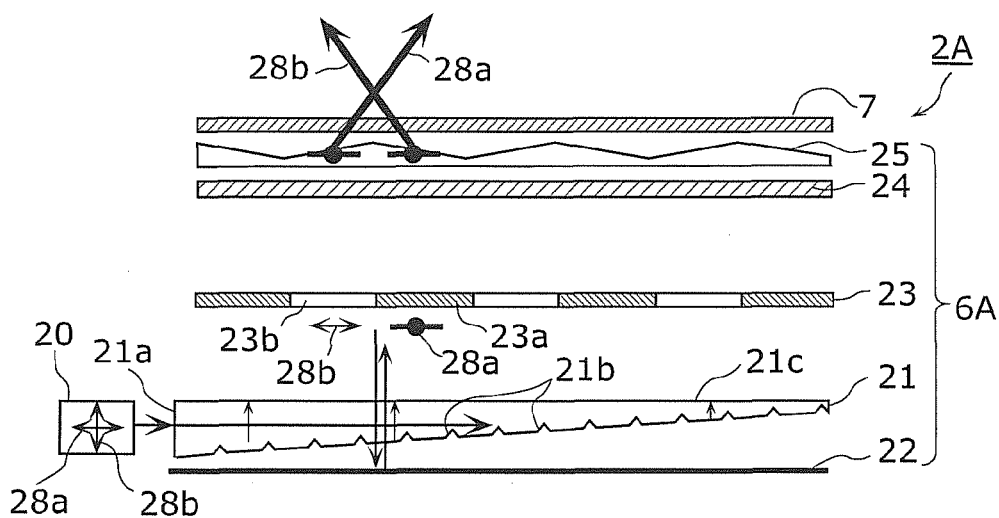
FIG. 6C is a sectional view showing the configuration of the liquid crystal display device in accordance with Embodiment 2 of the present invention.

As shown in FIG. 6A, the polarized light 28a passing through the polarizing filter 24 is incident on the second position 25b of the prism sheet 25. As shown in FIG. 6C, the polarized light 28a is deflected in a predetermined position and then, is emitted from the prism sheet 25, and is focused on the left eye of the viewer through the optical deflector 7.

As shown in FIG. 6A, the polarized light 28a reflected on the polarizing filter 24 is incident on the polarizing modulation plate 23 downward in this figure. At this time, in order to reliably allow the polarized light 28a reflected on the polarizing filter 24 to be incident on the polarizing modulation cell 23a, it is preferred that the polarizing modulation plate 23 and the polarizing filter 24 are in cross contact with each other. As shown in FIG. 6B, the polarized light 28a passes through the polarizing modulation cell 23a, resulting in that the polarizing direction of the polarized light 28a is modulated again to the vertical direction on the sheet of FIG. 6B. Here, the polarizing direction of the polarized light 28a propagating in space between the light guide plate 21 and the polarizing modulation plate 23 is a direction vertical to the sheet in both cases where the light propagates upward on the sheet and where the light is reflected on the polarizing filter 24 and propagates downward on the sheet. Thus, the polarized light 28a reflected on the polarizing filter 24 propagates downward on the sheet and passes through the light guide plate 21, and then, is reflected on the reflective sheet 22. In a similar manner, the polarized light 28a reflected on the reflective sheet 22 propagates upward on the sheet.

When the polarized light 28a totally reflected on the total reflection prism 21b of the light guide plate 21 is emitted from the principle surface 21c of the light guide plate 21 while slightly extending in the horizontal direction on the sheet, the polarized light 28a is multiply reflected between the polarizing filter 24 and the reflective sheet 22 until it passes through the non-polarizing modulation cell 23b. As a result, the polarized light 28a is emitted only from directly above the non-polarizing modulation cell 23b and therefore, the polarized light 28a can be extracted to the outside without losing any light quantity. To allow the polarized light 28a to be emitted from the principle surface 21c of the light guide plate 21 while being slightly extended horizontal to the sheet, for example, the total reflection prism 21b may have a small curvature, or the one side surface 21a of the light guide plate 21 may have a small curvature.

Next, when the polarized light 28b is emitted from the light source 20 in the direction vertical to the sheet of FIG. 5A, as shown in FIG. 5A, the polarized light 28b is incident from the one side surface 21a of the light guide plate 21, is totally reflected on the total reflection prism 21b of the light guide plate 21 and then, is emitted from the principle surface 21c of the light guide plate 21. When the polarized light 28b is totally reflected on the total reflection prism 21b, the polarizing direction is modulated to the direction horizontal to the sheet of FIG. 5A.

As shown in FIG. 5B, the polarized light 28b emitted from the principle surface 21c of the light guide plate 21 is incident on the polarizing modulation cell 23a and the non-polarizing modulation cell 23b of the polarizing modulation plate 23. The polarizing direction of the polarized light 28b passing through the polarizing modulation cell 23a is rotated by 90 degrees, thereby being modulated vertical to the sheet of FIG. 5B. The polarizing direction of the polarized light 28b passing through the non-polarizing modulation cell 23b is kept horizontal to the sheet of FIG. 5B without being modulated.

As shown in FIG. 5C, the polarized light 28b emitted from the polarizing modulation plate 23 is incident on the polarizing filter 24. The polarizing filter 24 reflects the polarized light 28b horizontal to the sheet of FIG. 5C and transmits the polarized light 28b vertical to the sheet of FIG. 5C.

As shown in FIG. 6A, the polarized light 28b passing through the polarizing filter 24 is incident on the first position 25a of the prism sheet 25. As shown in FIG. 6C, the polarized light 28b is deflected in a predetermined direction and then, is emitted from the prism sheet 25 and is focused on the right eye of the viewer through the optical deflector 7.

As shown in FIG. 6A, the polarized light 28b reflected on the polarizing filter 24 is incident on the polarizing modulation plate 23 downward in this figure. As shown in FIG. 6B, the polarized light 28b passes through the non-polarizing modulation cell 23b, resulting in that the polarizing direction of the polarized light 28b is kept horizontal to the sheet of FIG. 6B. Here, the polarizing direction of the polarized light 28b propagating in space between the light guide plate 21 and the polarizing modulation plate 23 is a direction horizontal to the sheet in both cases where the light propagates upward on the sheet and where the light is reflected on the polarizing filter 24 and propagates downward on the sheet. Thus, the polarized light 28b reflected on the polarizing filter 24 propagates downward in this figure and passes through the light guide plate 21 and then, is reflected on the reflective sheet 22. The polarized light 28b reflected on the reflective sheet 22 is multiply reflected between the polarizing filter 24 and the reflective sheet 22 as in the same manner as described. When the polarized light 28b is emitted from the principle surface 21c of the light guide plate 21 while slightly extending in the horizontal direction on the sheet, the polarized light 28b is multiply reflected between the polarizing filter 24 and the reflective sheet 22 until it passes through the polarizing modulation cell 23a. As a result, the polarized light 28b is emitted only from directly above the polarizing modulation cell 23a and therefore, the polarized light 28b can be extracted to the outside without losing any light quantity.

Accordingly, in the light-emitting device 2A in this embodiment, by switching the polarizing direction of the polarized light from the light source 20, the planar illuminator 6A is switched between a first state in which light from the non-polarizing modulation cell 23b is reflected on the polarizing filter 24, and light from the polarizing modulation cell 23a passes through the polarizing filter 24 and is incident on the first position 25a of the prism sheet 25, and a second state where the light from the polarizing modulation cell 23a is incident on the polarizing filter 24, and the light from the non-polarizing modulation cell 23b passes through the polarizing filter 24 and is incident on the second position 25b of the prism sheet 25.

In the light-emitting device 2A in this embodiment, since the polarized light 28a, 28b from the single light source 20 can be incident from only the one side surface 21a of the light guide plate 21, for example, use of the wedge-shaped light guide plate 21 prevents loss of polarized light emitted from the side surface on the opposite side to the one side surface 21a, improving the light utilization efficiency. Further, since the polarized light 28a, 28b from the light source 20 is totally reflected in the light guide plate 21 in a repeated manner, uniform illumination can be advantageously achieved.

In the case where the liquid crystal panel is provided on the light-emitting side in the light-emitting device 2A in this embodiment to configure the liquid crystal display device, following effect can be obtained. Generally, when random polarized light is incident on the liquid crystal display device, half of the light is absorbed by a polarizing plate in the liquid crystal panel. However, as in the light-emitting device 2A in this embodiment, by illuminating the liquid crystal panel with polarized light, the liquid crystal display device that generates no absorption of light by the polarizing plate in the liquid crystal panel and has a high light utilization efficiency can be achieved.

Moreover, by applying the light-emitting device 2A in this embodiment to the liquid crystal display device, the 3D liquid crystal display device can display a 3D image by use of the single light source 20, enabling cost reduction.

In the case where the liquid crystal panel is provided on the light-emitting side of the light-emitting device 2A in this embodiment to configure the liquid crystal display device, as in Embodiment, when the positions of the right eye and the left eye of the viewer are displaced from the central axis of the liquid crystal panel, the optical deflector 7 modulates the light deflection angle. When the positions of the right eye and the left eye of the viewer are located on the central axis of the liquid crystal panel, the optical deflector 7 does not modulate the light deflection angle. By appropriately setting inclination angles of the first position 25a and the second position 25b of the prism sheet 25, the light 28a emitted from the prism sheet 25 can be focused on the right eye of the viewer and the light 28b can be focused on the left eye of the viewer.

Although the light guide plate 21 is wedge-shaped in this embodiment, the shape of the light guide plate 21 is not specifically limited as long as the optical deflector 7 can be illuminated from the back surface side.

Embodiment 3

Figure 8A:
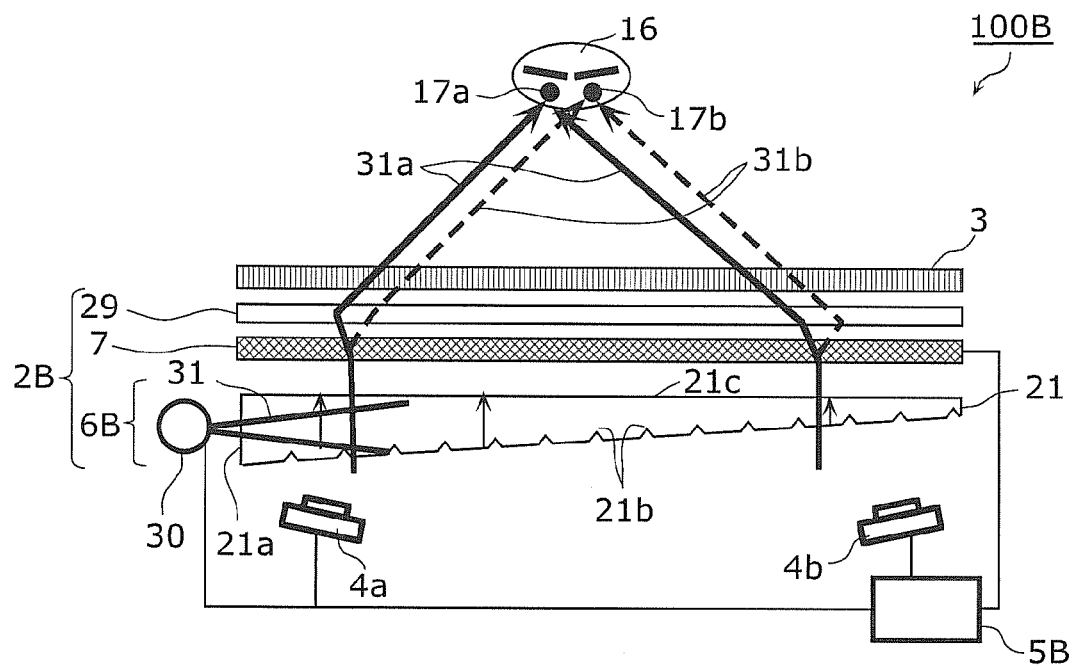
FIG. 8A is a sectional view showing a configuration of a liquid crystal display device in accordance with Embodiment 3 of the present invention.
Figure 8B:
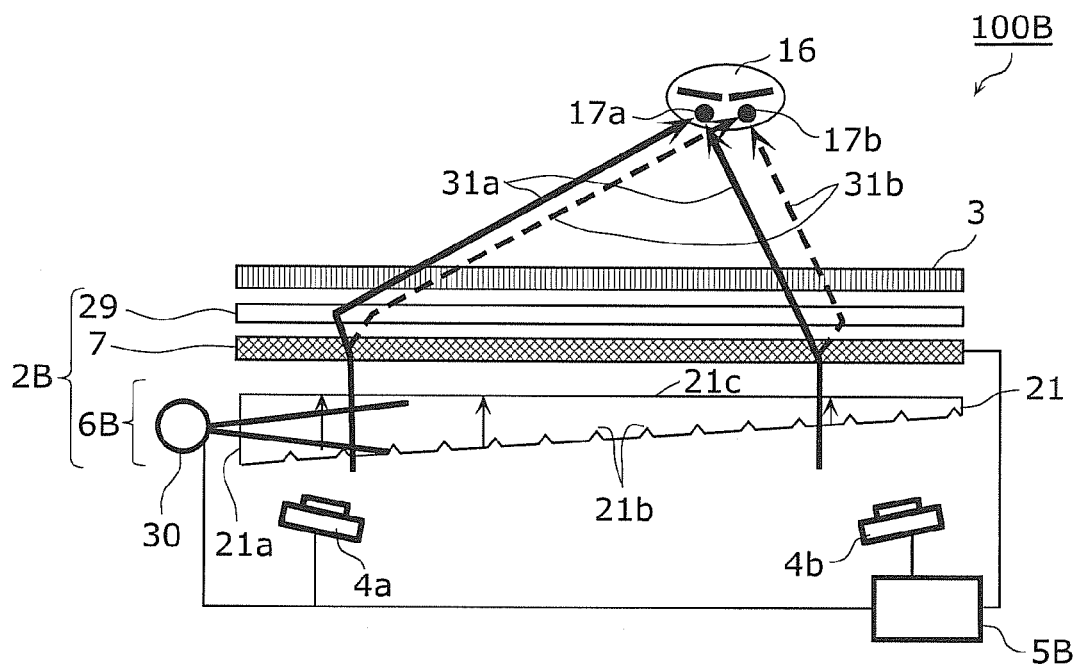
FIG. 8B is a sectional view showing the configuration of the liquid crystal display device in accordance with Embodiment 3 of the present invention.

FIG. 8A and FIG. 8B are views showing a configuration of a liquid crystal display device in accordance with Embodiment 3 of the present invention. The illustrated liquid crystal display device 100B includes a light-emitting device 2B, the liquid crystal panel 3, the right camera 4a, the left camera 4b and a control unit 5B.

The light-emitting device 2B includes the planar illuminator 6B, the optical deflector 7 and a Fresnel lens 29. The planar illuminator 6B has a light source 30 and the light guide plate 21. The light guide plate 21 has the same configuration as the light guide plate 21 in Embodiment 2. The light source 30 is provided opposed to the one side surface 21a of the light guide plate 21.

The optical deflector 7 is provided opposed to the principle surface 21c of the light guide plate 21. The optical deflector 7 has the same configuration as the optical deflector 7 in Embodiment 1.

The Fresnel lens 29 is provided on the light-emitting side of the optical deflector 7, and allows emitted light to focus on a predetermined light focus point. In this embodiment, the Fresnel lens 29 is formed of a linear Fresnel lens.

The right camera 4a, the left camera 4b and the control unit 5B have the same configurations as the right camera 4a, the left camera 4b and the control unit 5 in Embodiment 1, respectively.

Figure 9A:
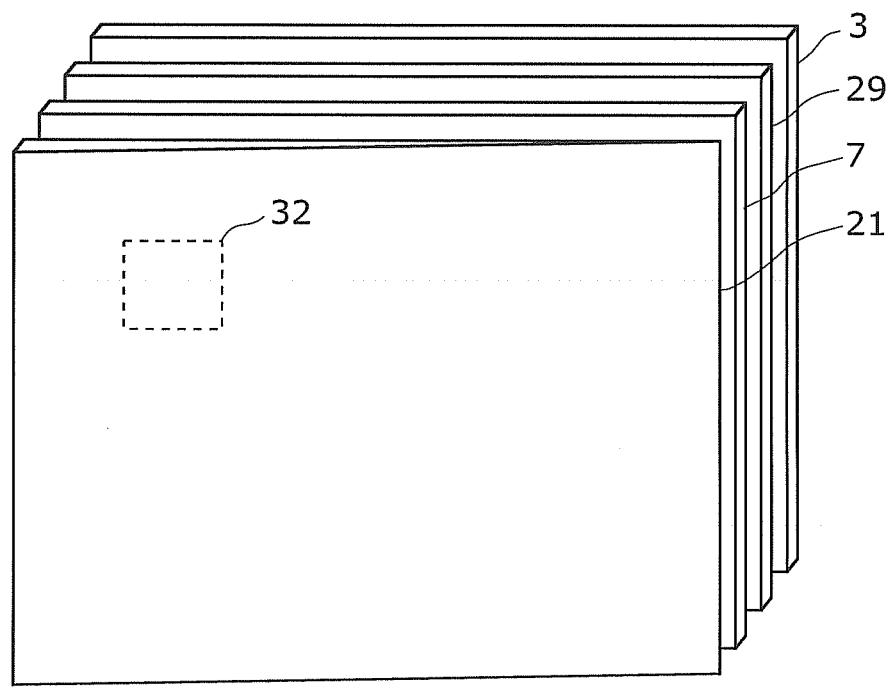
FIG. 9A is a perspective view showing a relationship among a light guide plate, an optical deflector, a Fresnel lens and a liquid crystal panel.
Figure 9B:
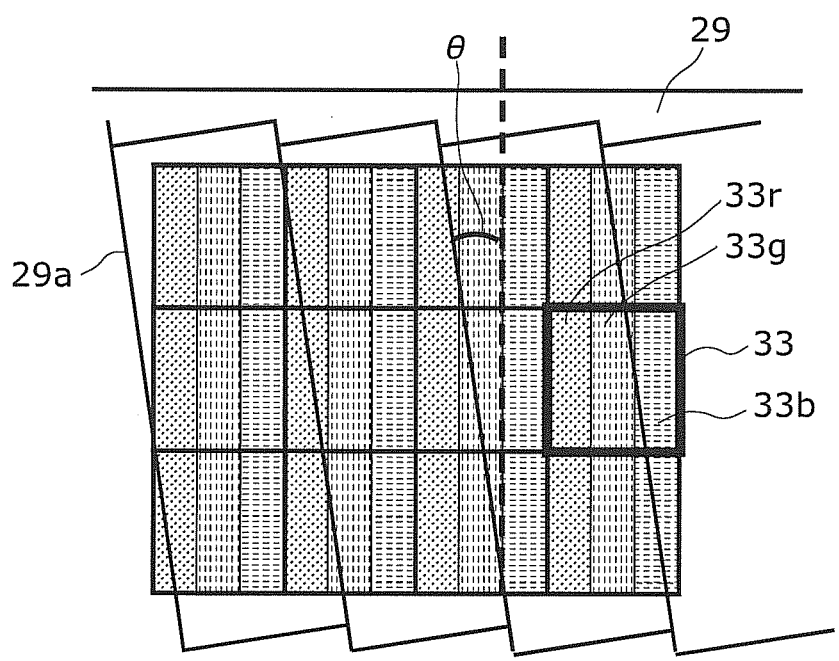
FIG. 9B is an enlarged view of an area surrounded by a broken line in FIG. 9A.

The liquid crystal panel 3 has the same configuration as the liquid crystal panel 3 in Embodiment 1. FIG. 9A is a perspective view showing a positional relationship among the light guide plate 21, the optical deflector 7, the Fresnel lens 29 and the liquid crystal panel 3. FIG. 9B is an enlarged view of an area 32 surrounded by a broken line in FIG. 9A. As shown in FIG. 9B, the liquid crystal panel 3 is configured by arranging a plurality of pixels 33 in a matrix. Each of the pixels 33 is configured of three sub-pixels, that is, a red sub-pixel 33r, a green sub-pixel 33g and a blue sub-pixel 33b. In the liquid crystal display device 100B in this embodiment, the Fresnel lens 29 is arranged so as to be inclined relative to each pixel 33 configuring the liquid crystal panel 3. Thereby, a ridge line 29a of a convex part of the Fresnel lens 29 is inclined relative to each pixel 33 by an angle θ. With such configuration, it is possible to suppress the occurrence of moire due to arrangement cycle of irregularities of the Fresnel lens 29 and arrangement cycle of the pixels 33 of the liquid crystal panel 3. To obtain such effects, it preferred that the inclined angle θ is 0.5 degree or larger.

Next, referring to FIG. 8A and FIG. 8B, a mechanism of operations of the liquid crystal display device 100B in this embodiment will be described. Light 31 emitted from the light source 30 propagates in the light guide plate 21, is totally reflected on the total reflection prism 21b provided on the bottom surface of the light guide plate 21, and is emitted from the principle surface 21c of the light guide plate 21 upward on the sheet. The light 31 emitted from the principle surface 21c of the light guide plate 21 is incident on the optical deflector 7. At a timing when a right image is displayed on the liquid crystal panel 3, the right light 31a is deflected by the optical deflector 7 in a predetermined direction. At a timing when a left image is displayed on the liquid crystal panel 3, left light 31b is deflected by the optical deflector 7 in a direction other than the above-mentioned predetermined direction. The right light 31a and the left light 31b that are emitted from the optical deflector 7 each are incident on the Fresnel lens 29. As shown in FIG. 8A, when the right eye 17a and the left eye 17b of the viewer 16 are located on the central axis of the liquid crystal panel 3, the optical deflector 7 deflects the right light 31a and the left light 31b in opposite directions by the almost same deflection angle and emits the deflected right light 31a and left light 31b. The Fresnel lens 29 is configured such that the right light 31a and the left light 31b that are deflected by the optical deflector 7 are incident on the right eye 17a and the left eye 17b of the viewer 16, respectively.

Accordingly, the optical deflector 7 switches the light deflection angle, thereby alternately switching between the first light focus state in which the predetermined light focus point is the right eye 17a of the viewer 16 and the second light focus state in which the predetermined light focus point is the left eye 17b of the viewer 16. The optical deflector 7 further modulates the predetermined light focus point in the first light focus state and the predetermined light focus point in the second light focus state according to the movement of the right eye 17a and the left eye 17b of the viewer 16.

In the liquid crystal display device 100B in this embodiment, by providing the Fresnel lens 29, the light deflection angle in the vicinity of both ends of the optical deflector 7 can be reduced. That is, since light emitted from the vicinity of the both ends of the optical deflector 7 is focused on the vicinity of the central axis of the liquid crystal panel 3 due to the effect of the Fresnel lens 29, it is no need to largely deflect the light emitted from the vicinity of the both ends of the optical deflector 7 by the optical deflector 7. In the case where no Fresnel lens 29 is provided, as compared to light emitted from the vicinity of the central axis of the liquid crystal panel 3, the light emitted from the vicinity of the both ends of the optical deflector 7 must be deflected toward the right eye 17a and the left eye 17b of the viewer 16, which are located in the vicinity of the central axis of the liquid crystal panel 3, by a larger deflection angle. In this case, to obtain a larger deflection angle, for example, in the liquid crystal deflection element, liquid crystal having a large refractive index variation is used. Alternatively, it is need to apply a high voltage to liquid crystal. However, by providing the Fresnel lens 29 as in this embodiment, the light deflection angle of the optical deflector 7 can be reduced to realize the inexpensive liquid crystal display device 100B with low power consumption. Further, since the deflection angle especially in the vicinity of the both ends of the optical deflector 7 is offset by the deflection angle of the Fresnel lens 29, even when the deflection angle of the optical deflector 7 is small, the distance between the liquid crystal panel 3 and the viewer 16 can be decreased to realize the more realistic liquid crystal display device 100B.

Although the Fresnel lens 29 is used in this embodiment, any element that can largely deflect light, such as a prism sheet, can be used.

Although the Fresnel lens 29 is provided on the light-emitting side of the optical deflector 7 in this embodiment, the Fresnel lens 29 can be provided in the light-receiving side of the optical deflector 7. This also applies to the case where the prism sheet is used in place of the Fresnel lens 29.

Embodiment 4

Figure 10A:
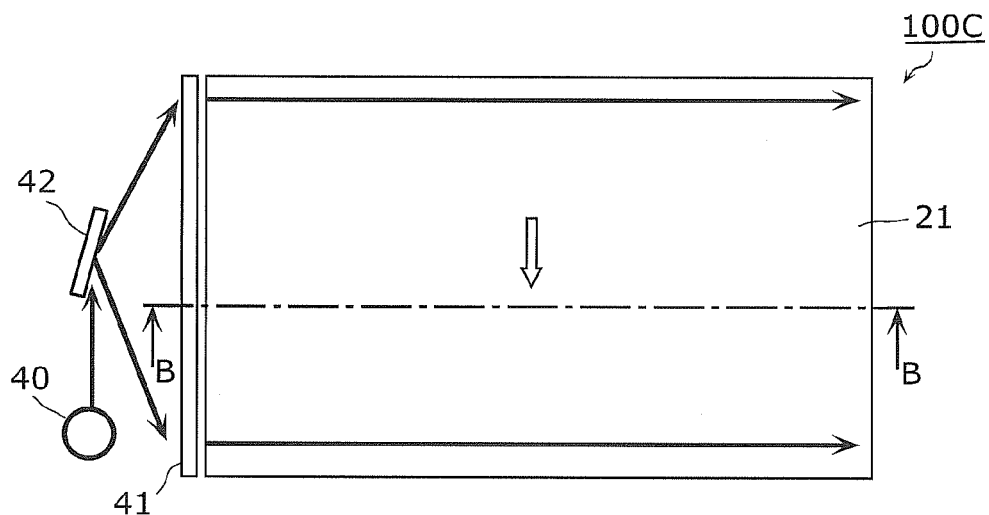
FIG. 10A is a plan view showing a configuration of a liquid crystal display device in accordance with Embodiment 4 of the present invention.
Figure 10B:
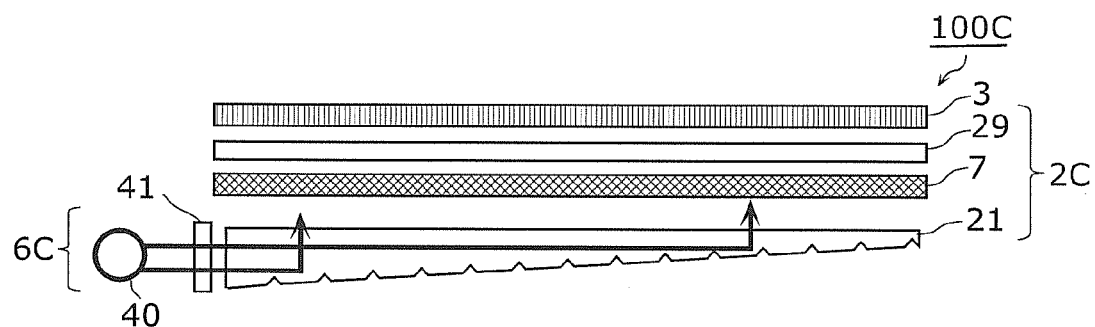
FIG. 10B is a sectional view of the liquid crystal display device cut along a line B-B in FIG. 10A.

FIG. 10A is a plan view showing a liquid crystal display device in accordance with Embodiment 4 of the present invention. FIG. 10B is a sectional view of the liquid crystal display device cut along a line B-B in FIG. 10A. It is noted that, in FIG. 10A, for easier comprehension, the optical deflector 7, the Fresnel lens 29 and the liquid crystal panel 3 are not shown.

A liquid crystal display device 100C in this embodiment includes a light-emitting device 2C and the liquid crystal panel 3 provided on the light-emitting side of the light-emitting device 2C. The light-emitting device 2C has a planar illuminator 6C, the optical deflector 7 and the Fresnel lens 29. The planar illuminator 6C has a light source 40, a Fresnel lens 41, a galvanometer mirror 42 and the light guide plate 21. Light from the light source 40 is scanned by the galvanometer mirror 42 and is incident on the light guide plate 21 substantially vertically through the Fresnel lens 41. The light incident on the light guide plate 21 proceeds in the same path as that in the liquid crystal display device 100B in Embodiment 3.

Figure 10C:
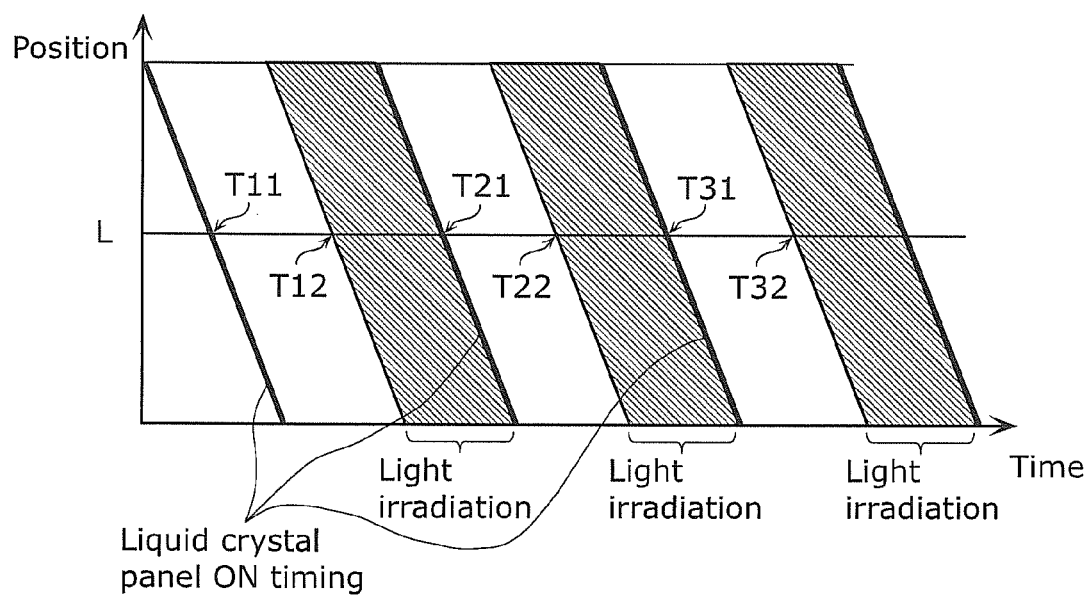
FIG. 10C is a diagram showing driving timing of the liquid crystal panel and lighting timing of a light source.

Next, with reference to FIG. 10C, driving timing of the liquid crystal panel 3 and lighting timing of the light source 40 will be described. FIG. 10C is a diagram showing the driving timing of the liquid crystal panel 3 and the lighting timing of the light source. In FIG. 10C, a horizontal axis represents time and a vertical axis represents a predetermined direction (vertical direction on the sheet of FIG. 10A) of the liquid crystal panel 3. FIG. 10C shows timing at which a pixel value is inputted to a predetermined pixel row in the above-mentioned predetermined direction of the liquid crystal panel 3 (that is, timing at which the liquid crystal panel 3 is turned on) and timing at which the light source 40 is lighted on and lighted off.

The pixel value is sequentially inputted to the plurality of pixel rows that configure the liquid crystal panel 3 on a predetermined scan cycle. Light from the light source 40 is scanned by the galvanometer mirror 42 and then, is sequentially projected to the plurality of pixel rows of the liquid crystal panel 3. The optical deflector 7 of the light-emitting device 2C deflects the light while scanning the light in sync with the predetermined scan cycle in the liquid crystal panel 3. As shown in FIG. 10C, for example, for an $L^{th}$ row among the plurality of pixel rows of the liquid crystal panel 3, at Time T11, the liquid crystal panel 3 is turned on and the pixel value is inputted to each pixel in the $L^{th}$ row of the liquid crystal panel 3. After that, at Time T12, the light source 40 is lighted on, and during a period from Time T12 to Time T21, light from the light source 40 continues to be projected to the $L^{th}$ row of the liquid crystal panel 3. Then, at Time T21, a pixel value of a next frame is inputted to each pixel in the $L^{th}$ row of the liquid crystal panel 3. Thereafter, the above-mentioned operations are repeated.

In the liquid crystal display device 100C in this embodiment, the optical deflector 7 deflects light while scanning the light in sync with the driving timing of the liquid crystal panel 3 and the lighting timing of the light source 40. For example, during a period from Time T11 to Time T12, light is reflected at the position of the optical deflector 7, which corresponds to the $L^{th}$ row of the liquid crystal panel 3. At this time, when driving time of the optical deflector 7 is a few milliseconds or smaller, driving of the optical deflector 7 is completed before the lighting timing of the light source 40 and therefore, the high-quality liquid crystal display device 100C without crosstalk can be configured.

Although the galvanometer mirror 42 is used as a light scanning means of the planar illuminator 6C in this embodiment, the light scanning means is not limited to this and may be a polygon mirror and a MEMS mirror, for example.

Embodiment 5

Figure 11A:
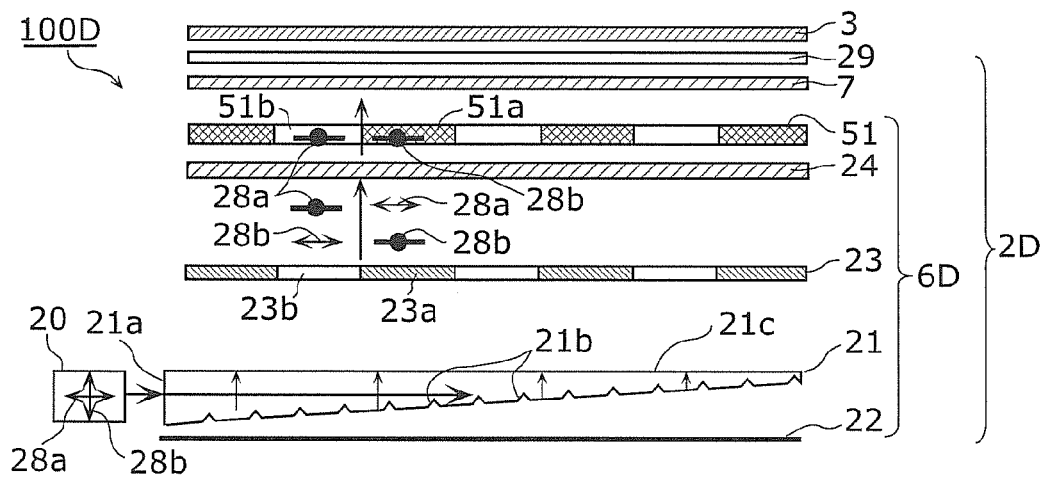
FIG. 11A is a sectional view showing a configuration of a liquid crystal display device in accordance with Embodiment 5 of the present invention.
Figure 11B:
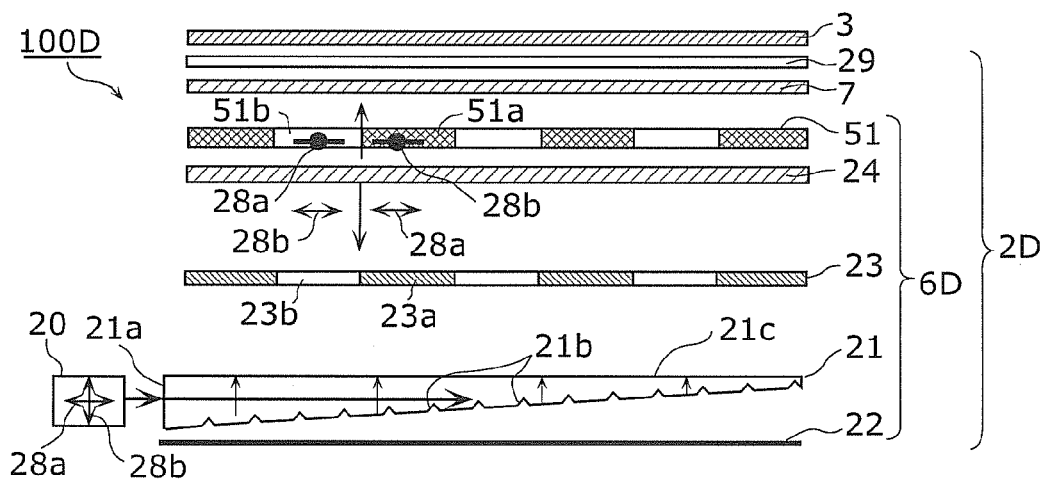
FIG. 11B is a sectional view showing the configuration of the liquid crystal display device in accordance with Embodiment 5 of the present invention.
Figure 11C:
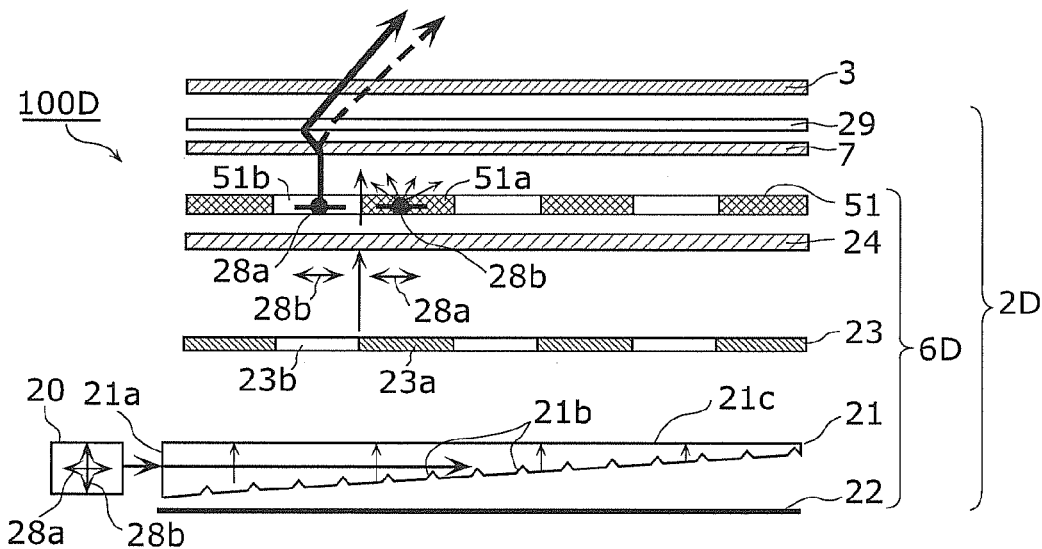
FIG. 11C is a sectional view showing the configuration of the liquid crystal display device in accordance with Embodiment 5 of the present invention.

FIG. 11A to FIG. 11C are sectional views showing a configuration of a liquid crystal display device in accordance with Embodiment 5 of the present invention. In the liquid crystal display device 100D in this embodiment, a planar illuminator 6D of the light-emitting device 2D has a diffuser panel 51. Other configuration of the light-emitting device 2D is the same as that of the light-emitting device 2A in Embodiment 2. The diffuser panel 51 is provided between the light-emitting side of the polarizing filter 24 and the light-receiving side of the optical deflector 7. The diffuser panel 51 is configured by alternately arranging a diffusing area 51a that diffuses light and a non-diffusing area 51b that does not diffuse light. The diffusing area 51a is arranged so as to correspond to the polarizing modulation cell 23a, and the non-diffusing area 51b is arranged so as to correspond to the non-polarizing modulation cell 23b.

A path in which the polarized light 28a, 28b from the light source 20 passes through the polarizing filter 24 is the same as that in Embodiment 2. When the polarized light 28a polarized horizontal to a sheet of FIG. 11A is emitted from the light source 20, the polarized light 28a incident on the non-diffusing area 51b from the polarizing filter 24 passes through the diffuser panel 51 without being diffused, and is incident on the optical deflector 7. Light deflected by the optical deflector 7 is deflected by the Fresnel lens 29 in the predetermined deflecting direction as in Embodiment 2 and then, is incident on the liquid crystal panel 3 to contribute to image formation. In this manner, the liquid crystal display device 100D in this embodiment can be used as the 3D liquid crystal display device that displays the 3D image or the privacy display.

When the polarized light 28b polarized vertical to the sheet of FIG. 11A is emitted from the light source 20, the polarized light 28b incident on the diffusing area 51a from the polarizing filter 24 is incident on the optical deflector 7. At this time, by controlling the light so as not to be deflected by the optical deflector 7, the diffused light passes through the Fresnel lens 29 and is incident on the liquid crystal panel 3. In this manner, the liquid crystal display device 100D in this embodiment can be used as the 2D liquid crystal display device that displays a normal 2D image.

Accordingly, in this embodiment, by the light source 20 switching the polarizing direction of the polarized light, a planar illuminator 6D switches between a light diffused state in which light from the non-polarizing modulation cell 23b is reflected on the polarizing filter 24 and light from the polarizing modulation cell 23a passes through the polarizing filter 24 and is incident on the diffusing area 51a, a non-light diffused state in which light from the polarizing modulation cell 23a is reflected on the polarizing filter 24 and light from the non-polarizing modulation cell 23b passes through the polarizing filter 24 and is incident on the non-diffusing area 51b.

That is, by the light source 20 switching the polarizing direction of the polarized light, the liquid crystal display device 100D can be switched between the 3D liquid crystal display device or the privacy display, and the 2D liquid crystal display device.

Although the diffusing area 51a is arranged so as to correspond to the non-polarizing modulation cell 23b and the non-diffusing area 51b is arranged so as to correspond to the polarizing modulation cell 23a in this embodiment, on the contrary, the diffusing area 51a may be arranged so as to correspond to the polarizing modulation cell 23a and the non-diffusing area 51b may be arranged so as to correspond to the non-polarizing modulation cell 23b.

Embodiment 6

Figure 12:
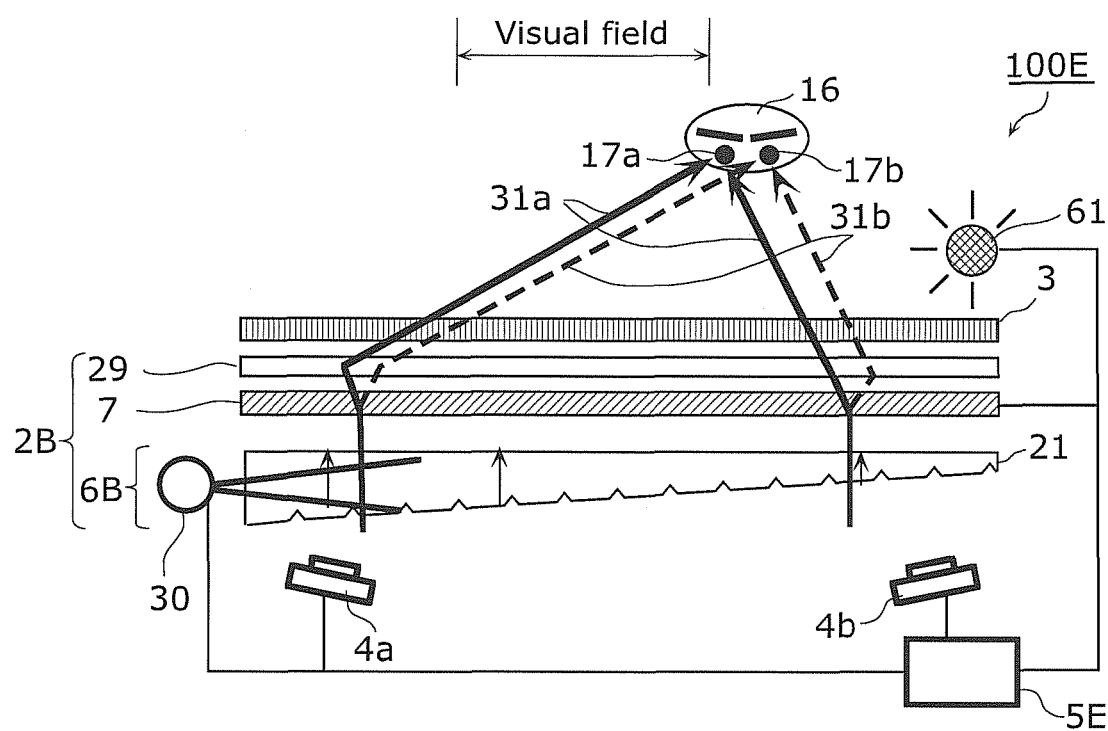
FIG. 12 is a sectional view showing a configuration of a liquid crystal display device in accordance with Embodiment 6 of the present invention.

FIG. 12 is a sectional view showing a configuration of a liquid crystal display device in accordance with Embodiment 6 of the present invention. The liquid crystal display device 100E (configuring the image display device) in this embodiment is provided with a lamp 61 (configuring an informing unit), and other configuration is the same as that in Embodiment 3. The lamp 61 is controlled by a control unit 5E. Thus, when the position of the right eye 17a and the position of the left eye 17b of the viewer 16 who visually recognizes the liquid crystal panel 3 (configuring a display unit), which are detected by the right camera 4a and the left camera 4b, respectively, fall outside a predetermined area (visual field), this is informed to the viewer 16 through lighting of the lamp 61.

Accordingly, in the case of using the liquid crystal display device 100E as the tablet-type 3D liquid crystal display device and the privacy display, for example, when the positions of the right eye 17a and the left eye 17b of the viewer 16 fall outside of the predetermined area, or either of the eyes 17a, 17b is located at an angle such that light cannot be deflected, this is informed to the viewer 16 through lighting of the lamp 61. This can promote the viewer 16 to return the positions of the right eye 17a and the left eye 17b of the viewer 16 to a proper visual field.

Although the informing unit is configured of the lamp 61 in this embodiment, the informing unit is not limited to this and may be configured of a buzzer. When the positions of the right eye 17a and the left eye 17b of the viewer 16 fall outside the predetermined area, the buzzer can be sounded. Alternatively, the informing unit may be configured of the liquid crystal panel 3, and when the positions of the right eye 17a and the left eye 17b of the viewer 16 fall outside the predetermined area, this as character information can be displayed on the liquid crystal panel 3.

Although the image display device is configured of the liquid crystal display device 100E in this embodiment, the image display device according to the present invention can be configured any image display device other than the liquid crystal display device as long as it can be used as the 3D image display device and the privacy display.

Although Embodiments 1 to 6 of the present invention have been described, configurations described in Embodiments 1 to 6 are merely examples and as a matter of course, can be variously modified so as not to deviate from the subject matter of the present invention. Further, Embodiments 1 to 6 can be combined with each other, or their modified inventions can be combined with each other.

Although the liquid crystal display device in Embodiments 1 to 6 is configured of the tablet-type 3D liquid crystal display device, the liquid crystal display device according to the present invention is not limited to the tablet-type and may be configured of a mounted-type 3D liquid crystal display device, for example.

INDUSTRIAL APPLICABILITY

The light-emitting device of the present invention can be used in the 3D liquid crystal display device and the privacy display that can extend the visual field where the 3D image is viewable. The liquid crystal display device of the present invention can be used as the 3D liquid crystal display device and the privacy display that can extend the visual field where the 3D image is viewable. Further, the image display device of the present invention can be applied as the image display device that can inform that the position of the viewer's eye falls outside the predetermined area to the viewer.

REFERENCE SIGNS LIST 2, 2', 2A, 2B, 2C, 2D: light-emitting device
3: liquid crystal panel
4a: right camera
4b: left camera
5, 5B, 5E: control unit
6, 6A, 6B, 6C, 6D: planar illuminator
7, 7': optical deflector
8, 8', 21: light guide plate
9a, 9b, 9', 20, 40: light source
10: liquid crystal deflection element unit cell
11: liquid crystal
12: dielectric
13a, 13b, 13c: electrode
14, 14s, 14m, 14h: light
15: angle extension lens
15a: convex lens
15b: concave lens
16: viewer
17a: right eye
17b: left eye
18a, 31a: right light
18b, 31b: left light
22: reflective sheet
23: polarizing modulation plate
23a: polarizing modulation cell
23b: non-polarizing modulation cell
24: polarizing filter
25: prism sheet
26: light source unit
27: light guide rod
28a, 28b: polarized light
29, 41: Fresnel lens
29a: ridge line
32: area
33: pixel
33r: red sub-pixel
33g: green sub-pixel
33b: blue sub-pixel
42: galvanometer mirror
51: diffuser panel
51a: diffusing area
51b: non-diffusing area
61: lamp
100, 100B, 100C, 100D, 100E, 500: liquid crystal display device

The invention claimed is:
1. A light-emitting device for use in a liquid crystal display device that alternately focuses light on positions of a right eye and a left eye of a viewer, said device comprising:
a planar illuminator that focuses emitted light on a predetermined light focus point; and
an optical deflector including a liquid crystal, the optical deflector two-dimensionally deflecting the light from the planar illuminator by modulating a refractive index of the liquid crystal, wherein the planar illuminator includes:
a light source that emits single polarized light and switches a polarization property of the single polarized light;
a light guide plate having one side surface that receives the light from the light source and a principle surface that is orthogonal to the one side surface and emits light;
a polarizing modulation plate provided on a light-emitting side of the light guide plate;
a polarizing filter that is provided on a light-emitting side of the polarizing modulation plate and reflects polarized light polarizing in a predetermined direction, out of light from the polarizing modulation plate; and
a prism sheet provided on a light-emitting side of the polarizing filter,
the polarizing modulation plate includes:
a polarizing modulation cell functioning as a wavelength plate that modulates the polarization property of the light; and
a non-polarizing modulation cell that does not modulate the polarization property of the light,
the prism sheet is configured to deflect transmitted light at a first position corresponding to the polarizing modulation cell and at a second position corresponding to the non-polarizing modulation cell in respective different directions,
the planar illuminator switches an emission direction of the light from the planar illuminator by switching an operation of the light source to enable alternate switching between a first light focus state in which the predetermined light focus point is the position of the right eye of the viewer and a second light focus state in which the predetermined light focus point is the position of the left eye of the viewer,
in switching the emission direction of the light from the planar illuminator, by switching the polarization property of the single polarized light by the light source, the planar illuminator switches between a first state and a second state, the first state being a state in which light from the non-polarizing modulation cell is reflected on the polarizing filter and light from the polarizing modulation cell passes through the polarizing filter and is incident on the first position of the prism sheet, and the second state being a state in which the light from the polarizing modulation cell is reflected on the polarizing filter and the light from the non-polarizing modulation cell passes through the polarizing filter and is incident on the second position of the prism sheet, and
the optical deflector modulates each of the predetermined light focus point in the first light focus state and the predetermined light focus point in the second light focus state by modulating the refractive index of the liquid crystal according to a movement of the viewer.

2. The light-emitting device according to claim 1,
wherein the optical deflector is configured of a liquid crystal deflection element capable of switching a light deflecting direction, and
a voltage is applied to the liquid crystal deflection element to modulate a refractive index of the liquid crystal deflection element, thereby switching the deflecting direction of light incident on the liquid crystal deflection element.

3. A liquid crystal display device comprising:
the light-emitting device according to claim 1; and
a liquid crystal panel provided on a light-emitting side of the light-emitting device,
wherein the liquid crystal panel is irradiated with light emitted from the light-emitting device.

4. The liquid crystal display device according to claim 3,
wherein the liquid crystal panel has a plurality of pixel rows to which a pixel value is sequentially inputted on a predetermined scan cycle, and
the optical deflector of the light-emitting device deflects light while scanning the light in sync with the predetermined scan cycle.

5. The liquid crystal display device according to claim 3, further comprising
a detector that detects positions of the right eye and the left eye of the viewer who visually recognizes the liquid crystal display device,
wherein the predetermined light focus point on which light is focused by the light-emitting device is the position of the right eye of the viewer and the position of the left eye of the viewer, which is detected by the detector.

6. A liquid crystal display device according to claim 3, further comprising:
a detector that detects a position of an eye of a viewer who visually recognizes the liquid crystal display device; and
an informing unit configured to inform the viewer that the position of the eye, which is detected by the detector, falls outside a predetermined area, when it occurs.

* * * * *